US006729266B1

(12) United States Patent
Gabriel et al.

(10) Patent No.: US 6,729,266 B1
(45) Date of Patent: May 4, 2004

(54) ANIMAL ISOLATION AND CAGING SYSTEM

(75) Inventors: George S. Gabriel, Seaford, DE (US); Neil Campbell, Eden, MD (US); Chin Soo Park, Salisbury, MD (US); Lynn Irwin, Seaford, DE (US); Rodney Gerringer, Belcamp, MD (US); Dale R. Murray, Elkton, MD (US); Richard Gabriel, Laurel, DE (US); Rick Dietrich, Woodbine, MD (US)

(73) Assignee: Lab Products, Inc., Seaford, DE (US)

( * ) Notice: Subject to any disclaimer, the term of this patent is extended or adjusted under 35 U.S.C. 154(b) by 0 days.

(21) Appl. No.: 09/705,617

(22) Filed: Nov. 3, 2000

(51) Int. Cl.[7] .................................. A01K 1/03
(52) U.S. Cl. ...................................... 119/419
(58) Field of Search ................ 119/475, 464, 119/456, 465, 454, 449

(56) References Cited

U.S. PATENT DOCUMENTS

| 4,989,545 A | * | 2/1991 | Sheaffer et al. ............. 119/419 |
| 5,349,923 A | * | 9/1994 | Sheaffer et al. ............. 119/418 |
| 5,865,144 A | * | 2/1999 | Semenuk ..................... 119/456 |
| 5,954,013 A | * | 9/1999 | Gabriel et al. .............. 119/419 |
| 5,996,535 A | * | 12/1999 | Semenuk et al. ........... 119/456 |
| 6,158,387 A | * | 12/2000 | Gabriel et al. .............. 119/419 |
| 6,305,324 B1 | * | 10/2001 | Hallock et al. ............. 119/248 |
| 6,308,660 B1 | * | 10/2001 | Coiro, Sr. et al. .......... 119/419 |

* cited by examiner

Primary Examiner—Thomas Price
(74) Attorney, Agent, or Firm—Stroock & Stroock & Lavan LLP

(57) ABSTRACT

An animal isolation and caging system which maximizes cage density within a ventilated rack is provided. The rack includes at least one air exhaust plenum, and at least one canopy disposed within the rack for ventilation of the cages housed in a rack system. The rack is capable of supporting a first cage within the rack below a first canopy, and also positioning a second cage below a second canopy. The filter top of the first cage provided by the invention also provides a filter retainer having a filter top retainer wall designed to be in contact with a first canopy unit forming an enclosed space so configured as to create an enclosed space from which the animal isolation and caging system of the invention creates a zone of negative pressure so as to permit air to be drawn into an air exhaust plenum or duct from the interior of the first cage through the top of the first cage.

15 Claims, 35 Drawing Sheets

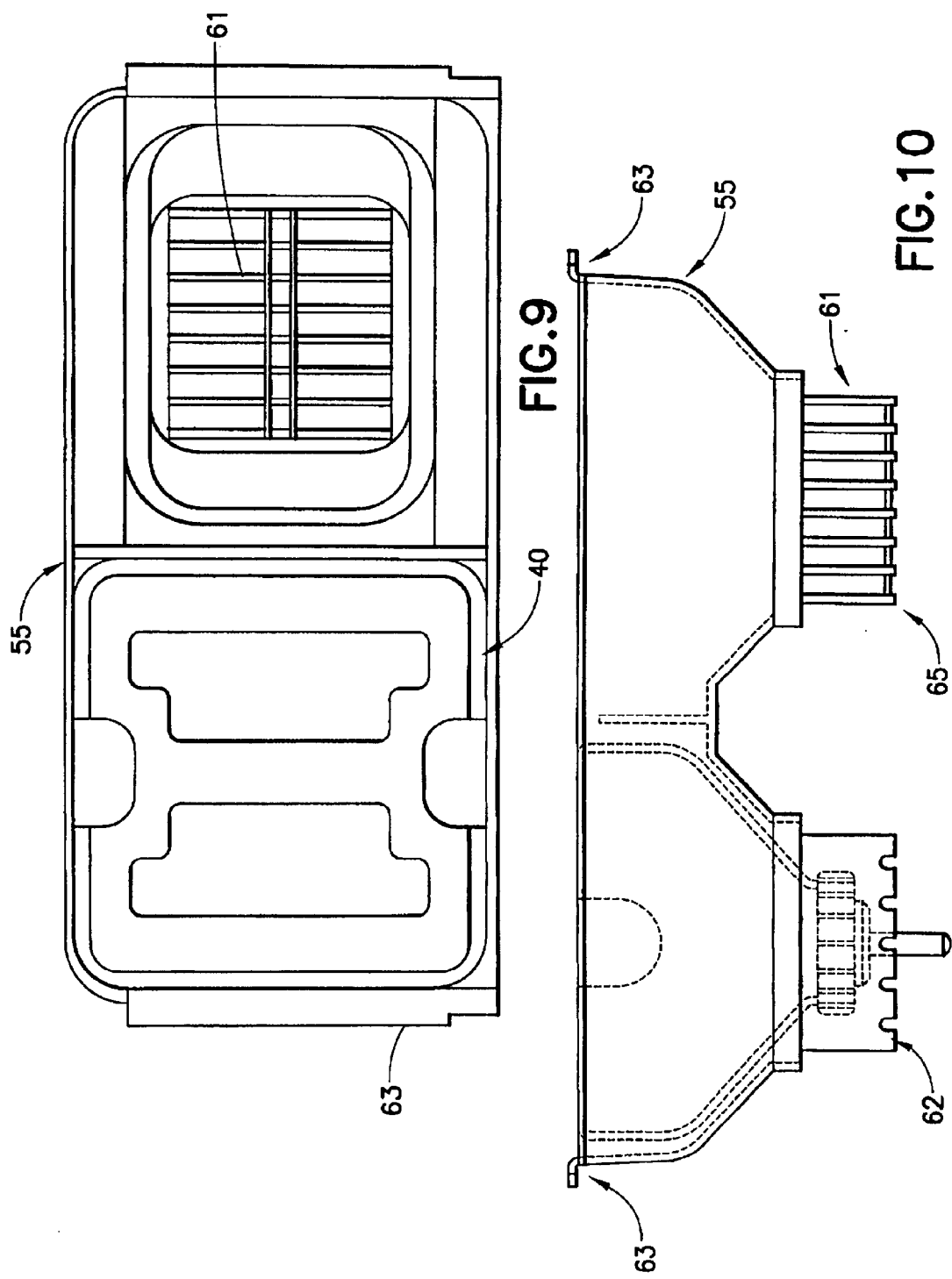

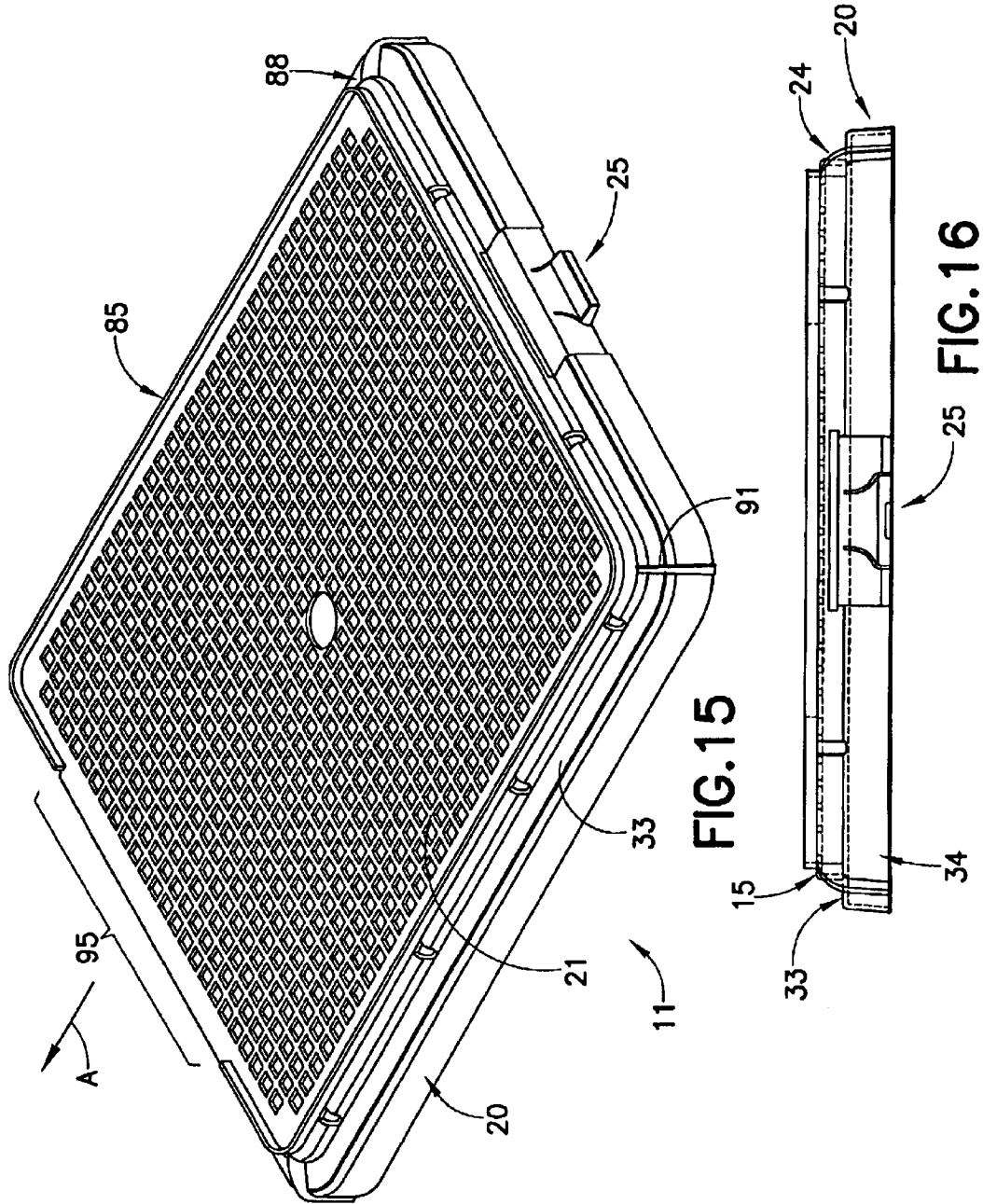

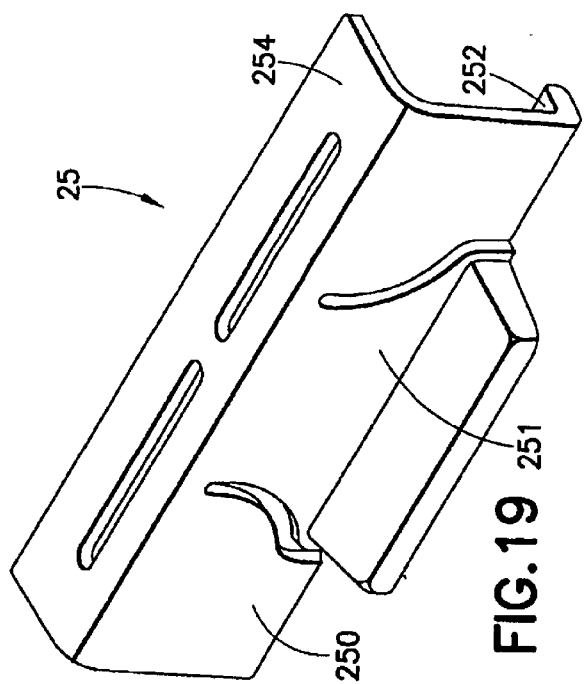
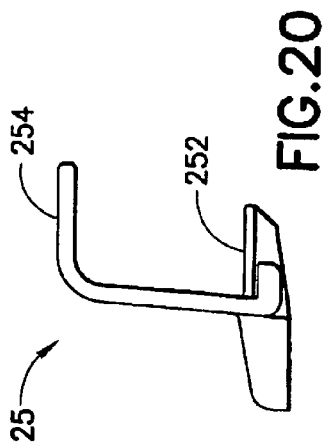
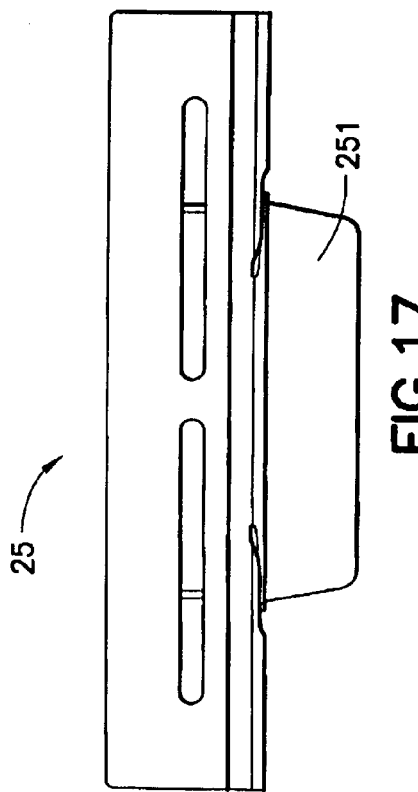
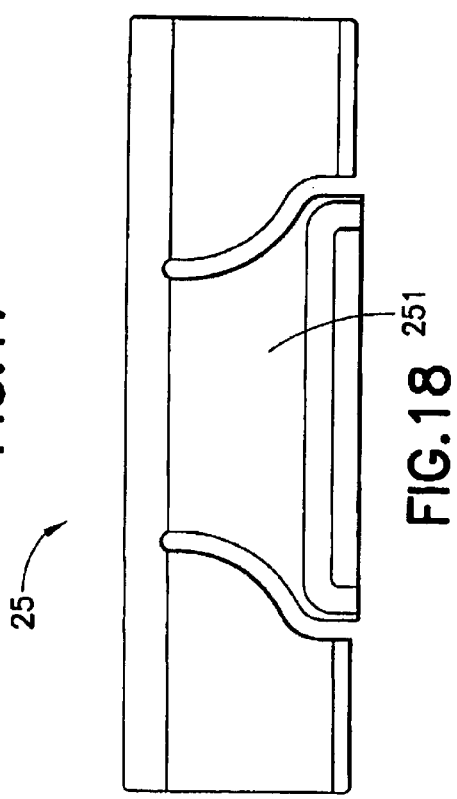

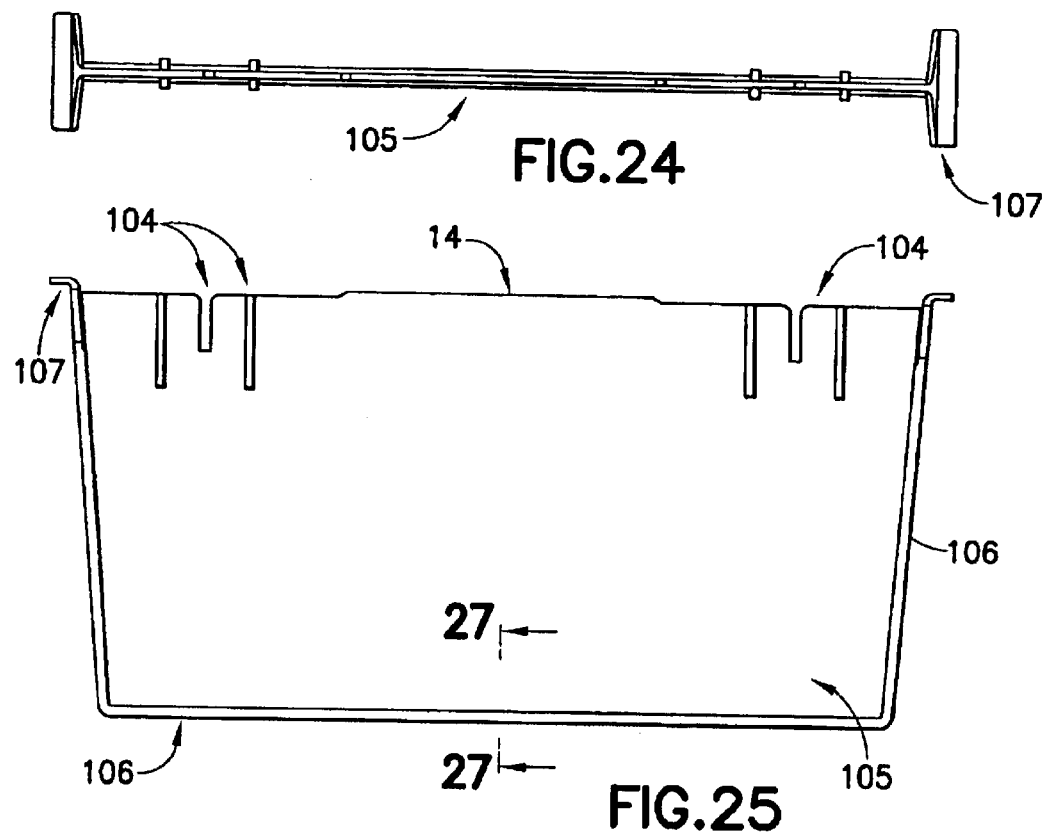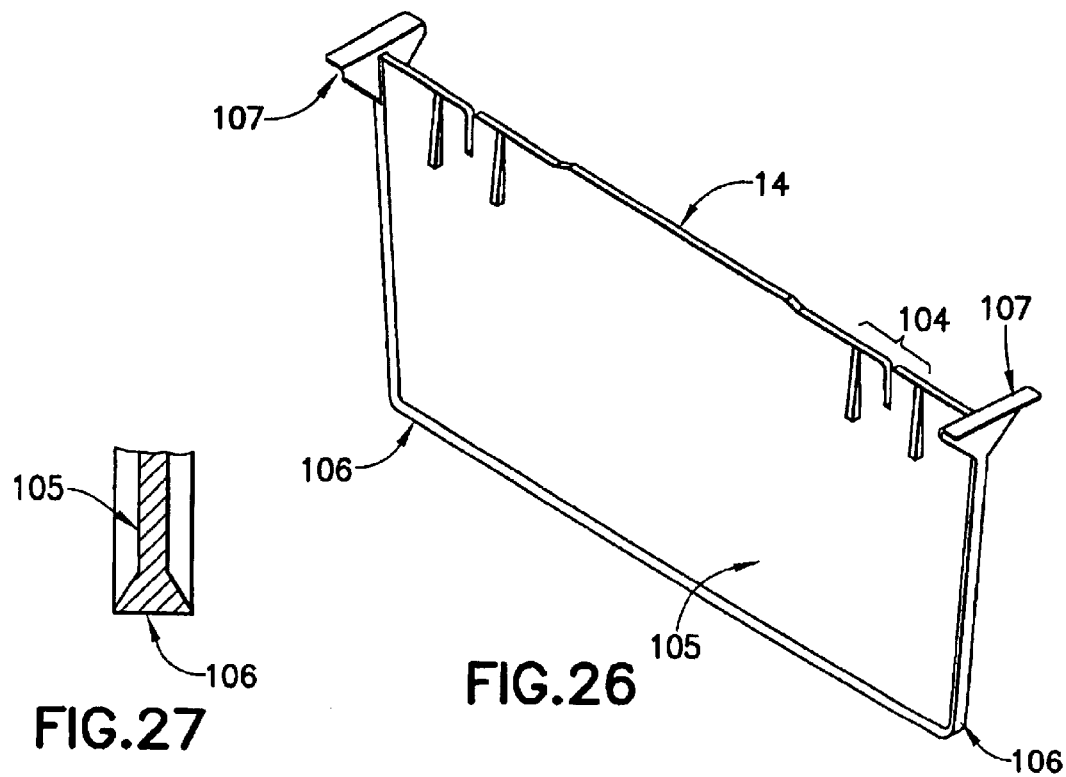

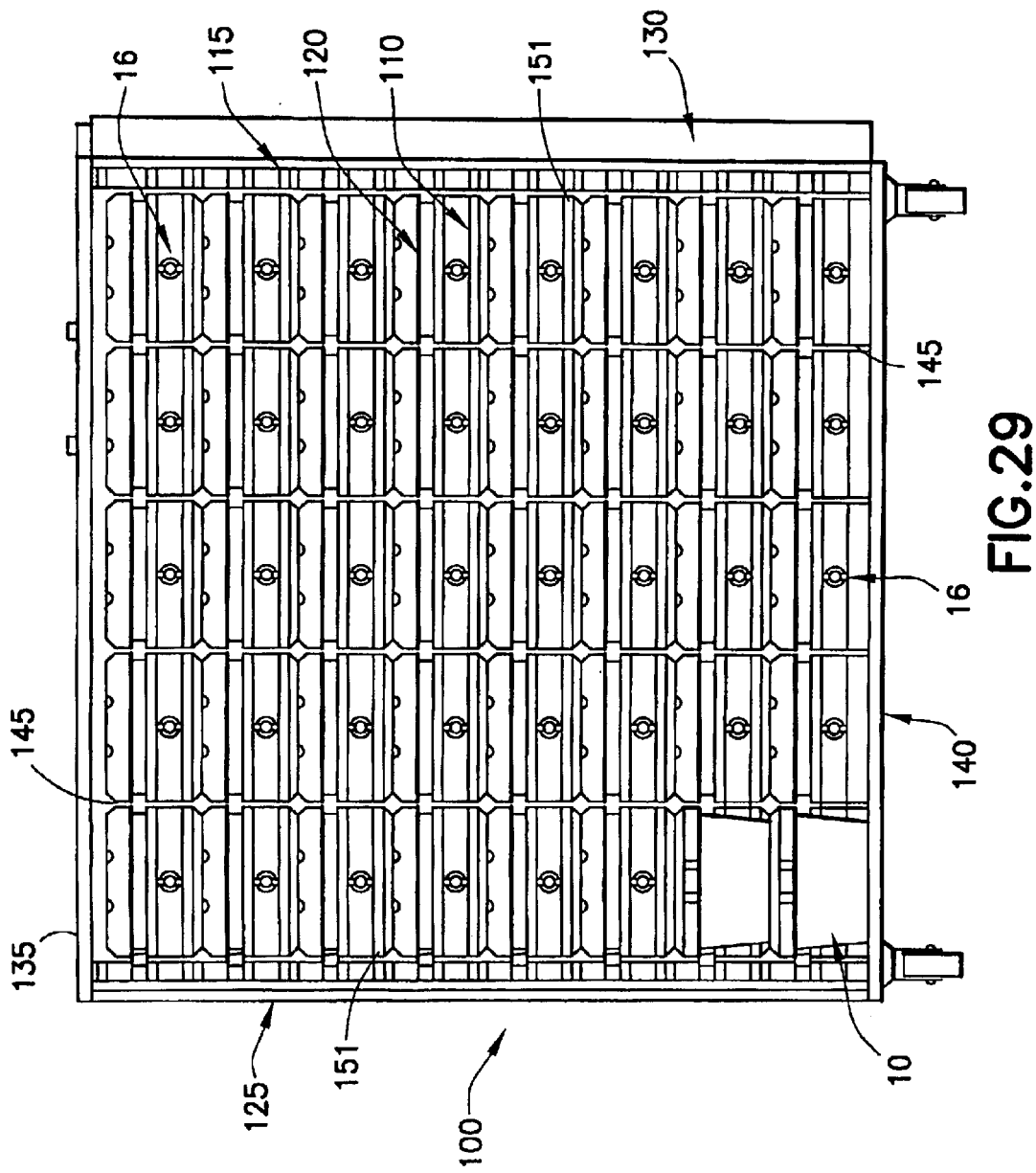

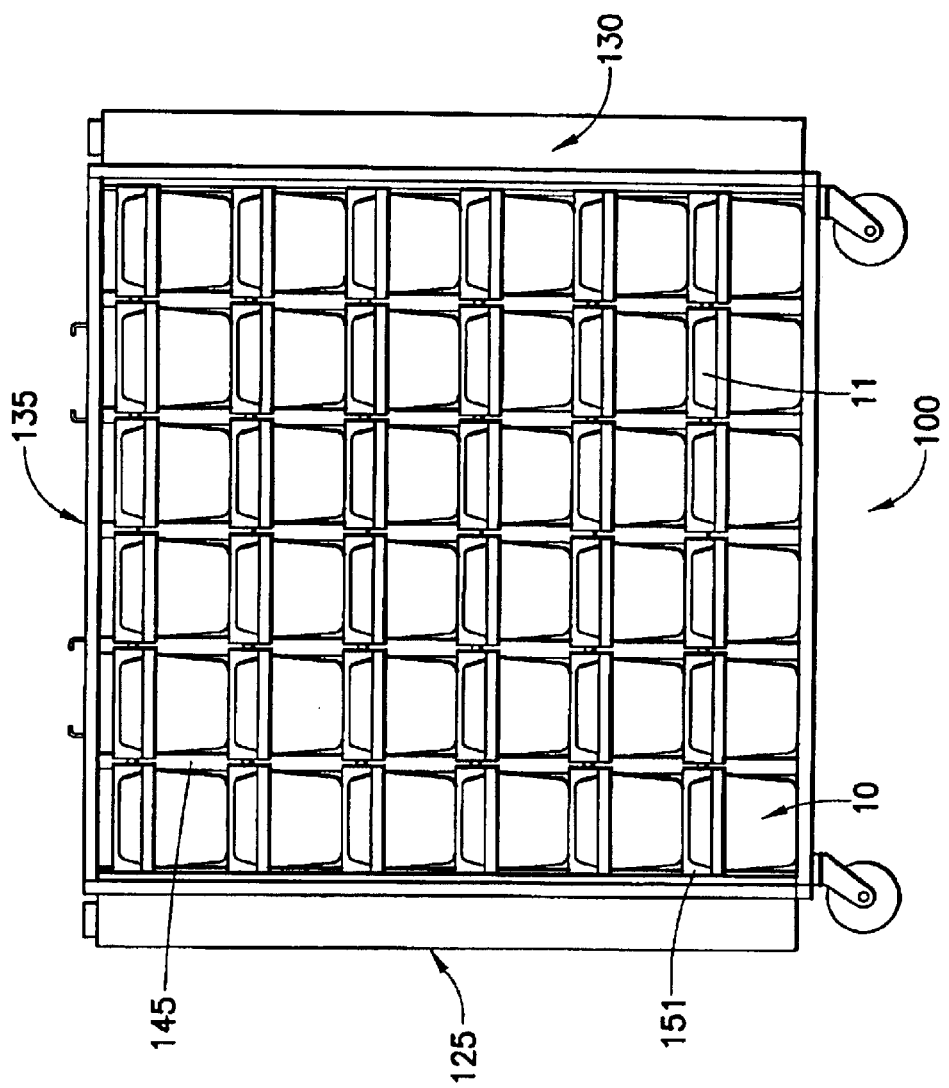

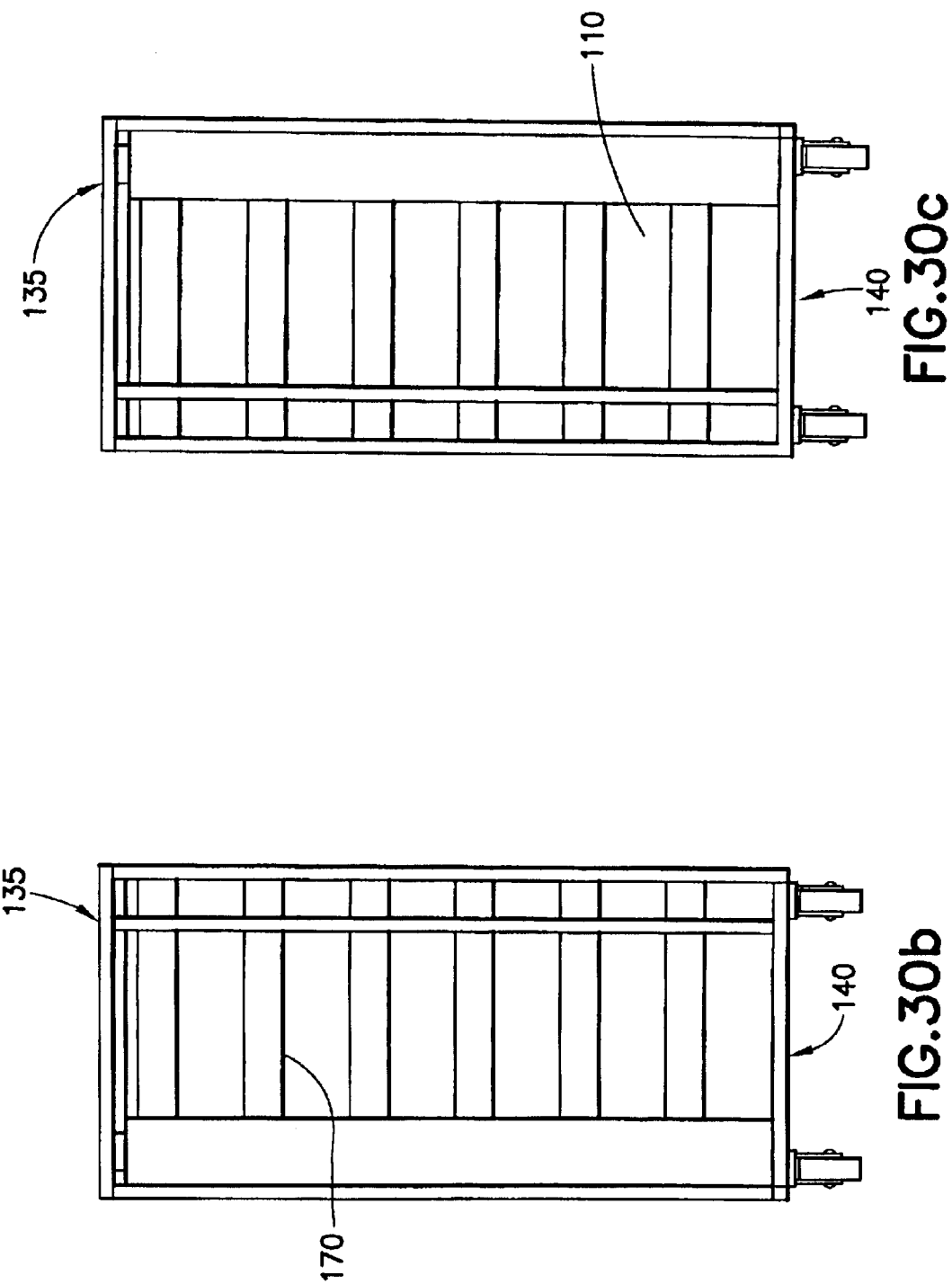

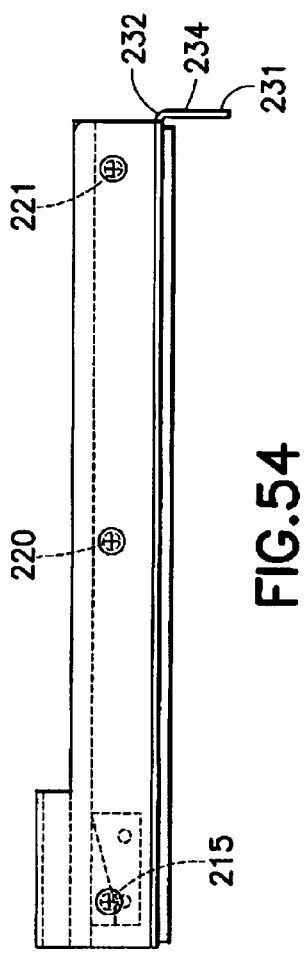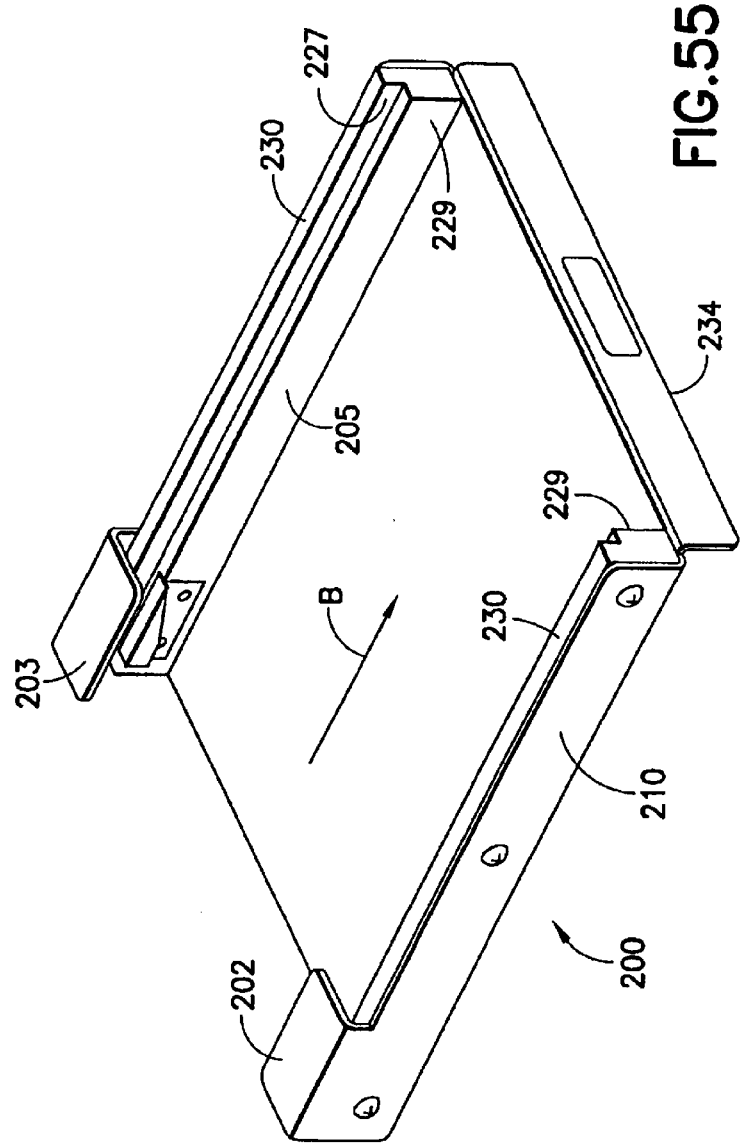

ANIMAL ISOLATION AND CAGING SYSTEM

FIELD OF THE INVENTION

This invention relates generally to an animal isolation and caging system, and more particularly to an open rack system which maximizes both cage density within the rack and useful volume within each cage while providing protection for both personnel attending to the system and the animals contained within the cages from the contamination of the cages themselves and from the release of allergens, dander or other contaminants from an individual cage or rack system housing a plurality of cages through the use of a canopy capture system.

BACKGROUND OF THE INVENTION

Animal isolation and caging systems are well known in the art. Such systems include the animal isolation and caging systems provided for in the ventilated rack systems disclosed in U.S. Pat. Nos. 5,349,923 and 5,165,362 assigned to Lab Products, Inc., in which an open rack system including a plurality of shelves, each formed as an air plenum, is provided. Air ventilation is provided directly to animals within each cage assembly by allowing air to travel within each shelf to a plurality of predetermined positions within the rack. At least one cage level barrier having a filter cap is positioned in a rack, so that the rack and the air conduits integral within it removes air disposed adjacent the filter cap. A cage guide is formed in substantially the same shape as the filter cap and is affixed to the bottom of a shelf of the rack holding a cage so that when the barrier cage is placed within the ventilated rack, it is positioned within the cage guide. The cage guide is separated from the filter cap of a cage by a distance. The air plenum shelf is provided with a vacuum to partially remove gases, dander, allergens and other compounds that originated in one or more cages and moving to a location outside the cage.

The prior art animal isolation and caging systems are satisfactory. However, because each shelf acted as an air plenum, each shelf required a certain height within the rack to allow for air to travel therethrough, and due to a lack of a enclosed canopy or other gas capture system, animals as well as workers maintaining cages could be exposed to high levels of allergens, disease causing agents, inappropriate chemical signaling agents (e.g., pheromones), dander or other undiserable compounds released from the animal cages themselves or present in the air in proximity to the cages. The answer provided by the prior art was to proportion the combined height of each shelfband the cage guides mounted below each shell to maximize vertical cage density, thereby maximizing the effect of negative pressure removal of contaminants, without providing for a means of creating a capture system for contaminants. Another problem provided by such prior art systems is the use of large amounts of opaque material or metal that hinder visual inspection of a high cage density rack system. A system that provided a "see through" system that would allow an operator to more easily determine the condition of individual animals and the environment in individual cages.

Filter cap assemblies for animal cages used within animal isolation and caging systems are also well known in the art. One such filter cap is disclosed in U.S. Pat. No. 4,640,228, assigned to Lab Products, Inc., in which a top body with a perforated filter cap top wall is provided. A sheet of filter material is sandwiched between a retainer and the lower surface of the perforated filter top wall of the top body. The retainer is detachably mounted inside the filter body in flush abutment with the filter material placed against the lower surface of the filter top wall of the top body. The retainer comprises a narrow border portion and flat cross arms which intersect at an integral central portion.

This prior art filter top was satisfactory. However, because the retainer was secured to the filter cap body on the interior of the filter cap body, changing a filter with an animal within the cage was inhibited because the entire filter cap required removal from the cage to remove the retainer and change the filter. Moreover, because the retainer was substantially open, the bottom side of the filter was substantially exposed to animals within the cage who might damage the filter, rendering it ineffective and resulting in contamination or requiring additional an structure such as a wire bar lid for protection of the filter.

Another solution to the filter changing problem is found in U.S. Pat. No. 5,797,349, assigned to Lab Products, Inc., in which a filter changing station is provided in which the filter protecting an individual cage can be changed without opening the entire cage. The changing station disclosed in this prior art is, however, difficult to operate and often results in the ripping of a used filter or the improper placement of a new filter in the filter cap.

Another such filter cap is enclosed in U.S. Pat. No. 4,480,587, assigned to Lab Products. Inc., in which a cap body with an open top portion provided with a ledge and cross arms is provided. A filter Is detachably secured to the cap body by an overlaying protective plate member which is fastened over the ledge and cross arms using a plurality of fasteners, such as threaded bolts which pass through holes in the plate member, filter and cap body and secured by respective nuts.

This prior art filter cap was also satisfactory. However, because separate threaded bolt fasteners were used to mount the protective plate to the filter cap body, personnel changing a filter were required to use special tools to remove the protective plate to release the filter. The use of such tools required additional resources and was time-consuming. Moreover, because the cap body had a substantially open top and no specific filter frame, the bottom side of the filter in this design was also unprotected from animals within the who might damage the filter and render it ineffective during a filter changing operation. In addition, the substantially open top inhibited changing a filter with an animal within the cage because of the possibility that the animal could escape through the open top of the cage body during a filter changing procedure.

Typically, the cages in a rack system must be removable from the rack system to provide access to the animals for feeding and testing, and to the cages for cleaning, maintenance and transport. However, it also required that the rack air source and/or water source mate with the cage to provide air and water to the cage. To accommodate this requirement it is known in the art to provide a structure so that the valve in each cage is connected to an air and/or water plenum on the rack by a coupling system. In such a system, each cage is connected to the plenum by pushing the cage into a rack until the coupling at the rear of the cage is connected to the coupling provided on the plenum to make mating contact with a valve system containing connections to water and air sources. The couplings are disengaged by simply pulling the cage out of the rack, which closes a valve within the plenum coupling to prevent the escape and contamination of water and air.

In the prior art, cages designed for ventilated cage and rack systems also failed to provide for securely dividing a cage between two or more animals. The designs provided in the prior art, as typified by U.S. Pat. No. 6,041,741, assigned to Lab Products Inc., disclose only one source of food and water respectively within a given cage. This may be undesirable in those situations where it is desirable to more effectively utilize a cage footprint in compliance with appropriate federal guidelines and increase occupancy of a given caging system, or in situations where dividing animals is necessary for research ends' or the animals' welfare. Accordingly, it is desirable to provide a double-sided ventilated caging system including a cage-level barrier cage with a specific footprint that complies with appropriate federal guidelines while simultaneously being available to house a multiplicity of different animals typically used in scientific studies and separate them into at least two compartments through use of a removable divider element that is contoured to the cage system and will prevent any caged animals from gaining purchase on the divider and chewing through it or otherwise damaging it. The compartments formed as a result of the removable divider element being provided with individual food and water sources.

Filter top locking mechanisms have also been designed to prevent an individual cage from being opened from within by an animal held there or accidentally opening when a worker uncouples a cage from the plenum and the rack in which it is located. However, these prior art designs have been large, cumbersome and expensive. Accordingly, it is desired to provide a simple, self-contained animal cage locking mechanism which enables an operator to lock a cage and keep it securely sealed yet easily manipulated by a worker handling individual cages who needs to maintain the cages and/or the animals within them. Such a locking mechanism should maintain engagement despite bumping, jarring or improper removal of an individual cage, and which should also be less cumbersome and more easily replaced if lost or damaged.

Accordingly, it is desired to provide a animal isolation and caging system which maximizes the stacking density of cages within the rack, while providing for the removal of unwanted contaminants from circulating in a laboratory environment, in the rack system itself, and among cages. It is also desirable to provide a double-sided ventilated caging system including cage-level barrier cages that minimize the use of opaque materials or metal which hinder visual inspection of a animal isolation and caging system. It is also desired to provide a modified filter cap for animal cages used in a animal isolation and caging system which permits easy changing of the filter while an animal is within the cage and which protects the filter in use and the filter top itself from damage caused by animal(s) housed in an individual cage. It is also desired to provide a cage design footprint that will house up to two full grown rats in compliance with appropriate lateral regulations, such a cage design also providing for a divider element that securely divide the cage into at least two equal compartments, each compartment having an individual food and water source. It is further desired to provide a simple animal cage locking mechanism which enables an operator to securely move, transport, or manipulate an individual cage that is itself easily and inexpensively replaced.

SUMMARY OF THE INVENTION

Generally speaking, in accordance with the instant invention, an animal isolation and caging system which maximizes cage density while minimizing the use of opaque materials and metal within a ventilated rack is provided. The rack includes at least one air exhaust plenum, and at least one canopy disposed within the rack for ventilation of the cages housed in a rack system. The rack is capable of supporting a first cage within the rack below a first canopy, and also positioning a second cage below a second canopy. The filter top of the first cage provided by the invention also provides a filter retainer having a filter top retainer wall designed to be in contact with a first canopy unit forming an enclosed space so configured as to create an enclosed space from which the animal isolation and caging system of the invention creates a zone of negative pressure so as to permit air to be drawn into an air exhaust plenum or duct from the interior of the first cage through the top of the first cage.

Generally speaking, in accordance with the instant invention, a filter cap for an open-top cage is further provided. The filter cap includes a substantially rigid filter frame bonnet adapted to cover the open top of the open-top cage. The filter frame bonnet includes a body portion with a perforated top, and side-walls extending therefrom forming an open bottom end. The filter cup also includes a substantially rigid filter retainer sized to fit upon the filter frame bonnet and to substantially cover the perforated top of the filter frame bonnet, the filter retainer also having a filter top retainer wall. The filter retainer includes a top end with perforations so as to allow the passage of air, and side walls extending from the top end of the filter retainer forming an open bottom end, the perforations in the filter retainer being substantially in alignment with the perforations in the filter frame bonnet when the filter retainer is mounted on the top of the bonnet. The filter cap further includes attachment means for detachably securing the filter retainer to the rest of the filter cap body to permit enclosure of a sheet of filter material therebetween, the attached means being integrally formed in the bonnet and the filter retainer, typically, being configured as snap rivets and or detents formed in a molded cage body.

Generally speaking, in accordance with the instant invention, the filter cap is further configured to provide for a detachable filter top lock designed to secure the filter cap to the cage body of the invention. The filter top lock being easily released by an operator, it being readily apparent as to whether a cage is properly secured. The filter top lock of the invention enabling an operator to securely move, transport, or manipulate an individual cage. The filter cap of the current invention also includes a chew shield configured to securely attach to the filter cap through the use of a plurality of snap rivets. The chew shield being designed to cover the open top of the cage body and able to prevent animals from having access to and/or damaging the filter frame, filter or filter retainer. The chew shield further having perforations substantially in alignment with the perforations in the filter frame.

Accordingly, it is an object of the invention to provide a animal isolation and caging system which maximizes the density of cages and animals housed within a ventilated rack system. To maximize animal density the current invention provides for a double-sided ventilated caging system including cage-level barrier cage with a specific footprint that complies with appropriate federal guidelines while simultaneously being available to house at least two large rats of the type used in scientific studies and separate them into at least two compartments through use of a removable divider element that is contoured to the cage system and will prevent any caged animals from gaining purchase on the divider and chewing through it or otherwise damaging it. The compartments formed as a result of the removable divider element being provided with individual food and water sources.

Another object of the current invention being to provide a double-sided ventilated caging system including cage-level barrier cages that, minimizes the use of opaque-materials or metal which hinder visual inspection of the animal isolation and caging system of the invention.

Another object of the invention is to provide a animal isolation and caging system which does not require distinct shelving for positioning and supporting cages within the rack and which thereby maximizes the proportion of space within the rack which may be occupied by cages.

Another object of the invention is to provide for a rotatable dosage feeder for an animal cage which slectively provides multiple exact dosages of food to an animal within a cage of the invention. The feeder has a frame dividing a cage interior side from a cage exterior side. A food holding member is rotatably mounted on the frame and holds a plurality of measured dosages of food. At least a portion of the food holding member extends within the cage to the cage interior side of the frame. In a preferred embodiment the food holding member is a carousel.

A further object of the invention is to provide a animal isolation and caging system with canopies which position and support cages within the rack without additional shelving and which, through canopy capture system, guide exhaust air drawn from cages within the rack through a canopy capture system into an air exhaust duct to remove exhaust air from the rack without contamination of operating personnel or cross-contamination between cages within the rack.

Still another object of the invention is to provide a filter cap for an open-top cage which permits a filter to be securely mounted yet easily and quickly changed with a filter removal device easily utilized by an operator.

A still further object of the invention is to provide a filter cap for an open-top cage which permits replacement of a filter while animals are within the cage and which prevents such animals from escaping during filter replacement.

Yet another object of the invention is to provide a filter cap for an open-top cage which protects the filter from damage caused by animals within the cage through the use of a chew shield.

Still other objects and advantages of the invention will in part be obvious and will in part be apparent from the specifications and drawings. The invention accordingly comprises the features of construction, combination of elements, and arrangement of parts which will be exemplified in the constructions hereinafter set forth, and, the scope of the invention will be indicated in the claims.

BRIEF DESCRIPTION OF THE DRAWINGS

For a fuller understanding of the invention, reference is had to the following description taken in connection with the accompanying drawings, in which:

FIG. 9 is a top plan view of a diet delivery system of the invention;

FIG. 10 is a front plan view of a diet delivery system of the invention;

FIG. 15 is a perspective view of the filter cap of the current invention showing the an attached filter top lock of the invention;

FIG. 16 is a front view of the filter cap of the current invention with the filter top lock of the current invention;

FIG. 17 is a plan top view of the filter top lock portion of the animal isolation and caging system of the invention;

FIG. 18 is a plan front view of a filter top lock element of the current invention detached from the filter cap and cage body of the current invention;

FIG. 19 is a perspective view of the filter top lock element of the current invention;

FIG. 20 is a plan side view of the filter top lock element of the current invention;

FIG. 24 is a plan top view of a divider element embodiment of the current invention;

FIG. 25 is a plan side view of a divider element embodiment of the current invention, with directional arrow A indicating the front of the cage body of the current invention;

FIG. 26. is a perspective view of a divider element of the current invention;

FIG. 27 is a partial cross-sectional and cutaway view of a divider element of the current invention;

FIG. 29. a plan side view of a double-sided rack system embodiment of the animal isolation and caging system of the present invention;

FIG. 30a is a plan side view of a single-sided rack system of the cage level barrier cage constructed in accordance with the present invention;

FIG. 30b is a front view of a single-sided rack system of the cage level barrier cage constructed in accordance with the present invention;

FIG. 30c is a front view of a single-sided rack system of the cage level barrier cage constructed in accordance with the present invention;

FIG. 54 is a side view of a filter removal device constructed in accordance with the present invention;

FIG. 55 is a perspective view of a filter removal device constructed in accordance with the present invention;

DETAILED DESCRIPTION OF THE PREFERRED EMBODIMENTS

Cape Body

Figure 1:
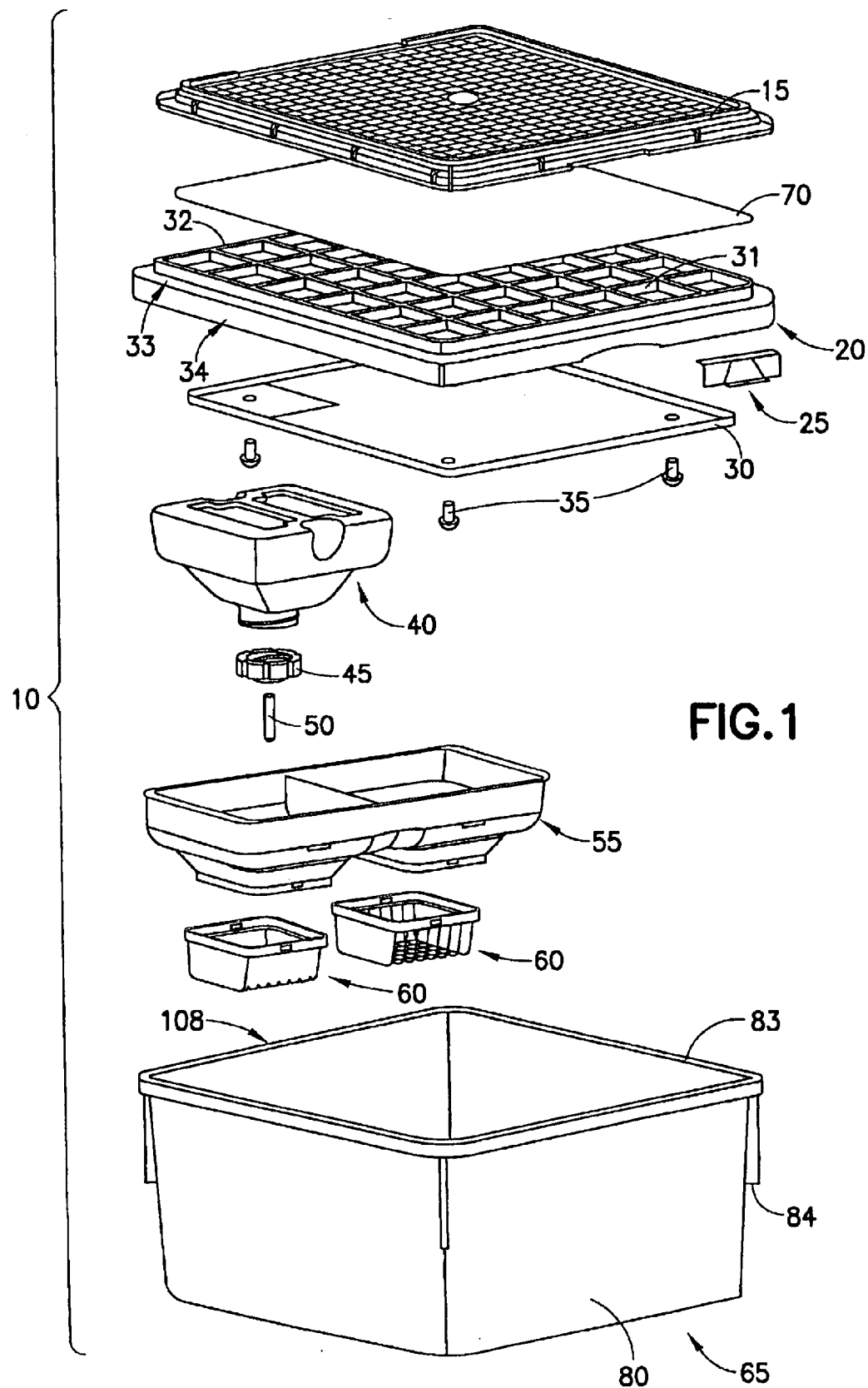
FIG. 1 is an exploded perspective view, of a single cage of the animal isolation and caging system constructed in accordance with the present invention.
Figure 2:
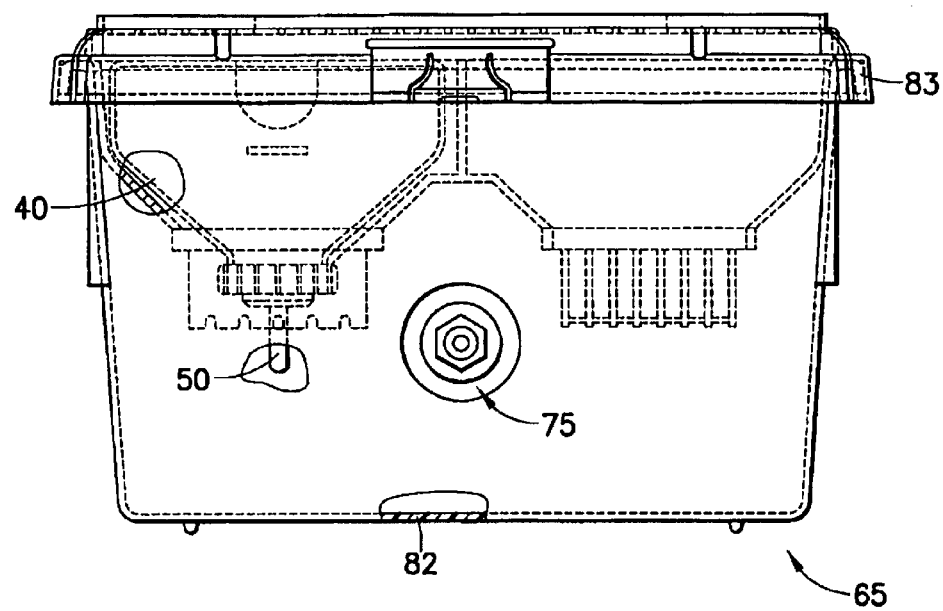
FIG. 2 is a plan front view of a cage of the current invention showing the diet delivery system water bottle, and cage-coupling.
Figure 4:
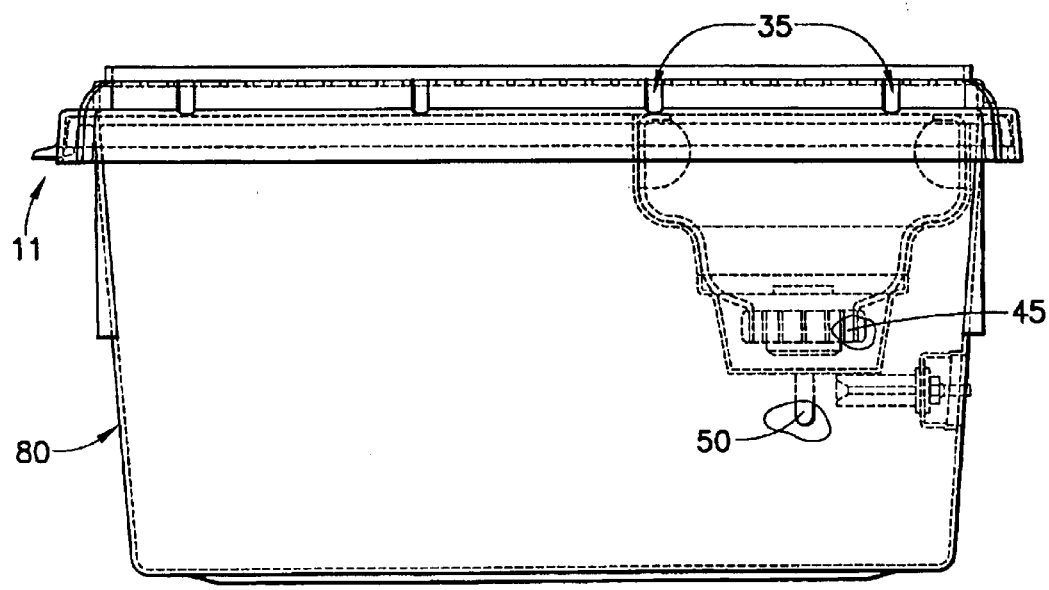
FIG. 4 is a side view of a cage of the current invention showing the proximity of the diet delivery system and the cage coupling.

Reference is first made to FIGS. 1–8, wherein a single cage of an animal isolation and caging system, generally indicated at 10, constructed in accordance with the invention is shown. The cage assembly incorporates a filter retainer 15, a filter frame 20, a filter top lock 25, a chew shield 30, a plurality of snap rivets 35, a water bottle 40, a bottle cap 45, a sipper tube 50, a diet delivery system 55, a plurality of diet delivery components 60, and a cage body 65. Cage body 65 comprises a box-like animal cage with a combination diet delivery system 55 capable of providing both food and water to animals within cage 10. A reusable filter 70 is also generally provided with caging system 10 sandwiched between filter retainer 15 and filter frame 20.

Cage body 65 is formed with integral side walls 80, a bottom wall or floor 82 and a open top end. The walls are preferably formed of a clear transparent plastic such as polycarbonate, which is rigid, durable, permits observation of animals, has a high impact strength, and is machine washable or autoclavable at temperatures under 250 degrees Fahrenheit. Such a cage is conventional, commercially available, and widely used. A standard absorbent flooring of particulate matter such as wood chips (not shown) may be spread on floor 82 of cage body 65. The open top of cage body 65 is bordered by peripheral lip 83 which extends continuously therearound. Cage body 65 may also include a plurality of corner structural reinforcements 84 for added structural support for cage 10. When included in a rack system 100 cage 10 may include a cage coupling valve 75 designed to attach cage 10 integrally into rack system 100 and provide water and air for animals located in an individual cage 10.

Referring now to FIGS. 21–27, another embodiment of the current invention provides for the placement of a removable divider element 105 whose peripheral edge 106 is contoured to the cage system 10 and will prevent any caged animals from gaining purchase on divider element 105 and chewing through it or otherwise damaging it. Each of the compartments 105a and 105b formed as a result of the removable divider element 105 being provided with individual food and water sources in the form of a plurality of diet delivery components 60. Specifically referring to FIGS. 24–27, it can be seen that divider element 105 is precisely contoured and molded to fit into cage body 65 and cage system 10 (not shown) without disturbing the integrity of the "petri dish" configuration between filter cap 11 and cage body 65 to form an enclosed caging system 10 capable of housing at least one animal in each of compartments 105a and 105b. Divider element 105 is configured so as to accept the placement of at least two diet delivery systems 55 (not shown) in divider grooves 104. Though divider element 105 may be constructed of any suitable material it is preferably formed out of opaque plastic material, the material chosen is rigid, durable, permits observation of animals, has a high impact strength, and is machine washable or autoclavable at temperatures under 250 degrees Fahrenheit.

Divider element 105, when placed in cage body 65 has peripheral edge 106 in flush contact with floor 82 and at least two opposing side-walls 80 (see FIGS. 21 and 23) and upper edge 14 that will be in contact with the undersurface of filter cap 11 when cage assembly 10 is closed. Divider element 105 has divider lips 107 that are contoured to fit within indents 108 in cage body 65 when divider 105 is positioned along the line indicated by arrow D in FIG. 25 from the front to rear of cage assembly 10 such that the integrity of the "petri dish" configuration between filter cap 11 and cage body 65 to form an enclosed caging system 10 is not altered. Though cage body 65 may be have a variety of dimensions provided to house individual laboratory animals in compliance with the provisions of the Animal Welfare Act ("AWA")(enacted in 1966) and the Institute of Laboratory Animal Resources ("ILAR") Guidelines (1996) specify certain space parameters for specific animal species and for animals at specific developmental stages or weights. ANIMAL WELFARE ACT 9 C.F.R. §§Chapter 1 et seq. (1966), and as amended 7 U.S.C. §§2131 et seq.; and see, GUIDE FOR THE CARE AND USE OF LABORATORY ANIMALS, Institute of Laboratory Animal Resources (ILAR);National as Academy Press Washington, D.C. (1996)(both incorporated herein by reference), the use of divider element 105 cage body 65 would be divided into compartments 105a and 105b each of sufficient size to house a variety of animals also in compliance with AWA and ILAR. In one embodiment of cage assembly 10 the dimensions of cage body 65 would be sufficient to provide a footprint of at least 140 square inches, preferably 140.8 square inches. This footprint is sufficient to house to large rats within the confines of a cage assembly 10 with or without divider 105. Rack system 100 may be configured such that 80 cages providing 140.8 square inches of floor space each may be provided in a double-sided rack system and 36 cages of a similar dimension in a single-sided rack system. It should be remembered that the mobile rack systems envisioned by the invention are dimensioned so as to be movable through the typical and well known dimensions of doors in terms of width and height. Mobile rack systems are also capable of continuously providing air and water to cages placed within and attached to the rack systems 100. It is also envisioned that other animals, including mice, would be housed within the confines of cage assembly 10 with any needed changes to cage size or dimension, including changes to divider grooves 104 or peripheral edge 106 to conform to changes in cage dimensions.

Referring now to FIGS. 9–12, the current invention provides for the use of a diet delivery system 55 for providing food and needed liquids to laboratory animals in cage assembly 10. Diet delivery system 55 is composed of a water bottle 40 that typically contains water for animals consumption but may be used to provide liquids other than pure water, and diet delivery components 60. Components 60 may be utilized to provide solid food to animals within cage assembly 10. Diet delivery system 55, bottle 40, and components 60 may be composed of any material or combination of materials, typically plastics with some machined metal features such as a metal wire food holder element 61 or bottle holder element 62. Diet delivery system 55 has flanges 63 that fit within cage body grooves 64 to securely hold diet delivery system within cage body 65 and above the floor 82 (not shown) so that food and water are accessible to animals within cage 10. Cage body grooves 64 are contoured such that when flanges 63 of diet delivery system 55 are placed therein filter cap 11 of cage assembly 10 can be easily closed and sealed with filter top lock 25 (not shown).

In alternate embodiment according to the invention diet delivery system 55 and bottle 40 may be made of clear plastic such that observation of animals in cage assembly 10 is optimized. In this instance holder elements 61 and 62 may still be composed of machined metal but in this embodiment the machined metal portions of holder elements 61 and 62 are reduced to the lower portions of components 60 with the upper body 66 of components 60 made of clear or nonmetallic material.

Referring now to FIGS. 31–47, another embodiment of cage assembly 10 and rack system 100 is construction of a cage assembly 10 and rack system 100 that emphasizes the use of clear materials that would allow an operator to more easily determine the condition of individual animals and the environment in individual cages. In this embodiment the plastics utilized by a manufacturer to produce cage assembly 10 and rack system 100 would be clear, not opaque, and metallic components would be limited as possible, including chew shield 30 and cage coupling 75. Moreover, rack system 100 would utilize high impact plastics materials in air supply plena 110, air exhaust plena 120, and open rack 115.

Rack System

Referring now to FIGS. 28–39, an animal isolation and caging rack system 100 of the invention includes an open rack 115 having a left side wall 125 and a right side wall 130, a plurality of rack coupling stations 16, a top 135, and a bottom 140. A plurality of posts 145 are disposed in parallel between top 135 and bottom 140. Vertical posts 145 are preferably narrow and may comprise walls extending substantially from the front of rack 115 to the rear of rack 115, or may each comprise two vertical members, one at or near the front of rack 115 and the other at or near the rear of rack 115. Rack system, in accordance with the embodiments of the current invention, may be a one-sided rack system with regard to cage assemblies placed therein as seen in FIGS. 30a–c and 34–36 or two-sided as seen in FIGS. 31–33 and 37–39.

Animal isolation and caging rack system 100 also includes a plurality of air supply plena 110 and air exhaust plena 120 alternately disposed in parallel between left side wall 125 and right side wall 130 in rack 115. Air is forced into air supply plena 110 by at least one control unit 150 through an air supply conduit 151, said air supply conduit 151 communicating with each air supply plenum 110 through a side wall of the rack 115. A control unit 150 preferably communicates with a blower 155 (not shown) and at least one rack air filter 158 for supplying filtered air to rack 115 and a plurality of cage level barrier cage assemblies 10. Air is withdrawn from air exhaust plena 120 by a vacuum 160 through air exhaust conduit 165, said air exhaust conduit 165 communicating with each air exhaust plenum 120 through a side wall of the rack 115. A plurality of cage level barrier cages (cages 10) may be positioned within rack 115. Each cage is formed of a gas impermeable floor 82 having an upstanding sidewall 80 and a filter cap 11.

Now referring to FIGS. 13–16 and 59–67, a plurality of cage assemblies 10 are positioned within rack 115 by canopies generally indicated at 170. Each canopy 170 shrouds a cage assembly 10a below a canopy 170. Accordingly, each canopy 170 is shaped and positioned so as to come into substantial contact with peripheral lip 83 which extends from the upper wall 23 of filter retainer 15 from a cage assembly 10a. Accordingly, with the substantial contact between lip 83 and a canopy 170 there is the creation of an exhaust zone 175 above filter cap 11 of cage assembly 10a. Unwanted gasses and contaminants including allergens, dander, dust and ammonia moving into exhaust zone 175 from cage assembly 10a are moved from exhaust zone 175 through exhaust channel 95 across canopy capture element 90 forming a canopy capture channel "C" into an exhaust duct 165 or exhaust duct 165a. This movement is initiated through the creation of a negative pressure in exhaust zone 175 by a vacuum 160 (not shown). The placement of a cage assembly 10a in rack 115 causes an engagement between the upper surface of filter cap 11 and canopy capture element 90. This exhaust of contaminants or unwanted gasses protects animals in each of the cage assemblies 10 present in a rack 115 through the individual venting of exhaust zone 175 and also protects operators utilizing the animal isolation and caging system of the invention from exposure to allergens or other contaminants.

Canopy capture element 90 maintains a short gap h between the top 23 of filter cap 11 and canopies 170. Gap h should be sufficient to allow movement of gases between canopy 170 and filter cap 11, and in an exemplary embodiment gap h is ¹⁄₁₆ of an inch to ¼ of an inch. Canopy 170 profiles filter cap 23 and overlaps overhangs lateral peripheral flange 88 of filter cap 11, preferably creating a tension fit against the sidewall 80 of cage body 65. The rear of canopy capture element 90 is attached to air exhaust duct 165 or air exhaust plenum 120.

Canopies 170 are disposed in parallel columns in rack 115 between each pair of adjacent posts 145, or between left side wall 125 and an adjacent post 145, or between right side wall 130 and an adjacent post 145. Each canopy 170 supports a first cage 10a above the canopy 170 in the rack 115 and shrouds the filter cap 11 of a second cage 10b below the canopy 170 in the rack forming a exhaust zone 175 with peripheral lip 83. The floor 82 of a cage assembly 10 of the first cage 10a rests on top of the corresponding canopy 170. Of course, those canopies positioned at the top row of rack 115 do not support a cage assembly 10 above them, and those cages 10 positioned on the bottom row of rack 115 are preferably supported by bottom 116 of rack 115. When positioned in the rack, each cage assembly 10 communicates with air supply plenum 120 through a cage coupling 75. Such cage couplings 75 are known in the art, and are disclosed, for example, in U.S. Pat. Nos. 4,989,545 and 5,042,429 assigned to Lab Products, Inc. Air supply plena 120 may also include means for delivering a supply of water to cage assemblies 10 through cage coupling 75, as is also known in the art. Canopies 170 are preferably constructed of a lightweight, transparent material which is substantially rigid, such as clear plastic. Such clear plastic canopies provide enhanced visibility of cage assemblies 10 within rack system 100 and reduce the overall weight of rack system 100.

Figure 28:
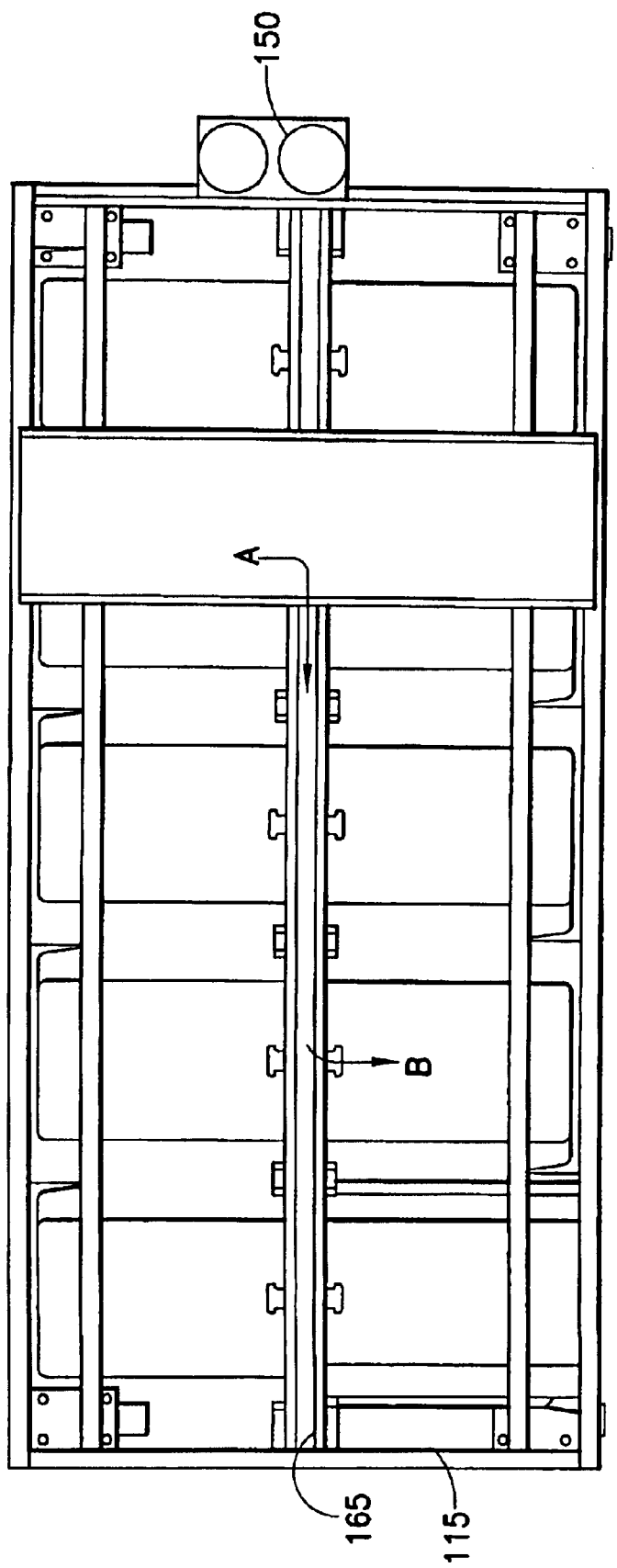
FIG. 28 is a plan top view of a double-sided rack system embodiment of the animal isolation and caging system of the present invention.
Figure 31:
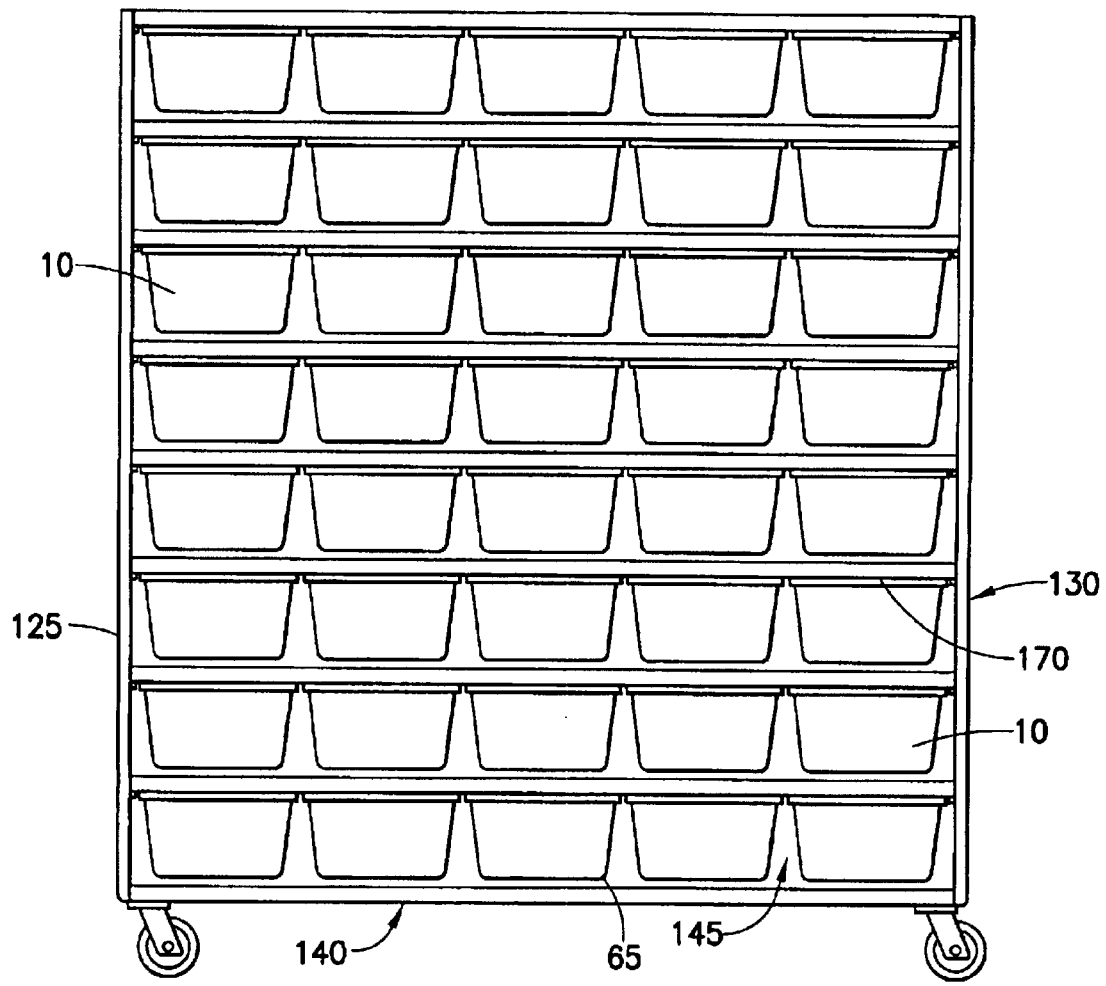
FIG. 31 is a plan side view of a cage locking system for securing the cages of the current invention to a double-sided rack system of the animal isolation and caging system constructed in accordance with the present invention.
Figure 32:
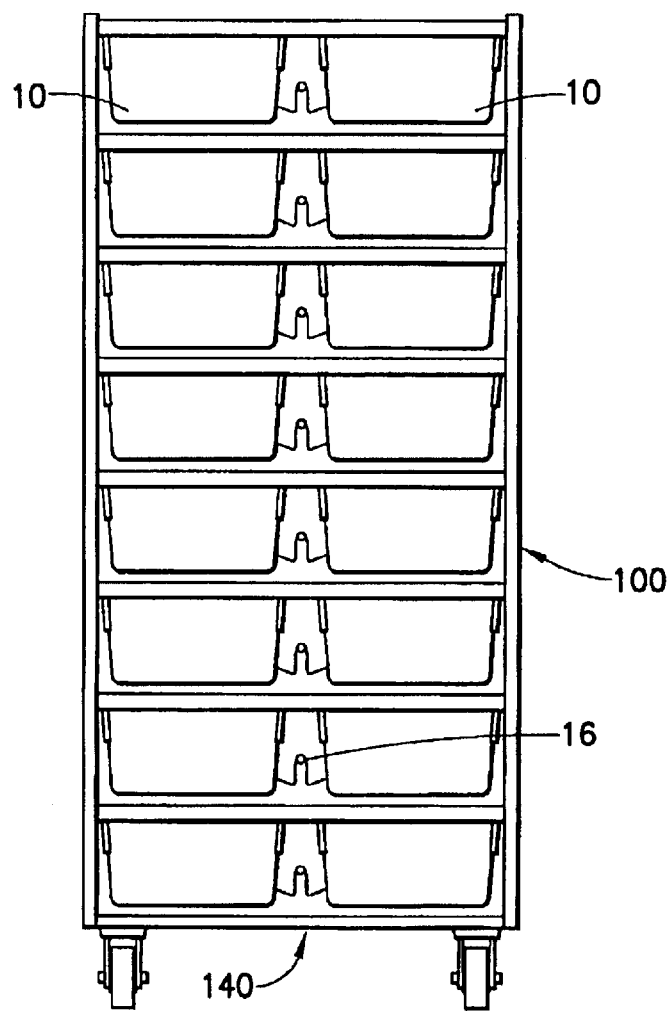
FIG. 32 is a plan front view of a cage locking system for securing the cages of the current invention to a double-sided rack system of the animal isolation and caging system constructed in accordance with the present invention.
Figure 33:
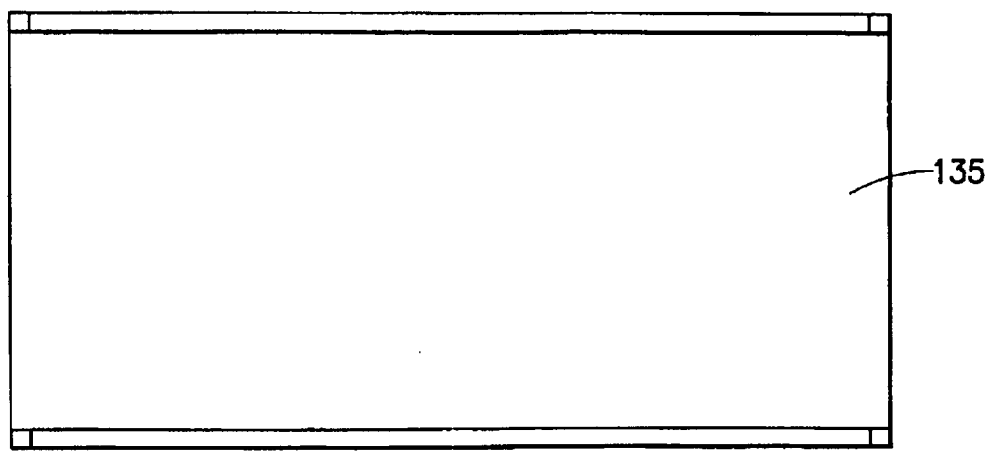
FIG. 33 is a plan top view of a double-sided rack system of the animal isolation and caging system constructed in accordance with the present invention.
Figure 34:
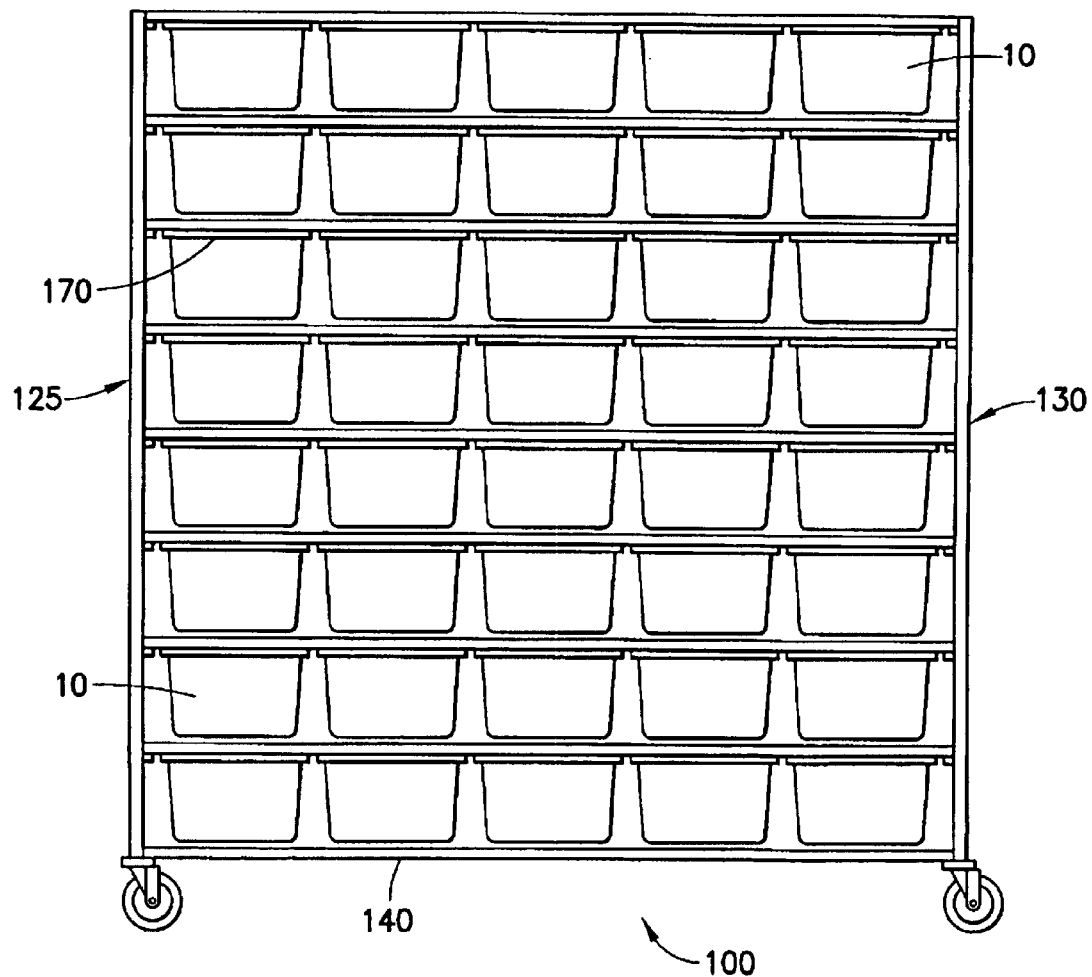
FIG. 34 is a side view of a cage locking system for securing the cages of the current invention to a single-sided rack system of the animal isolation and caging system constructed in accordance with the present invention.
Figure 35:
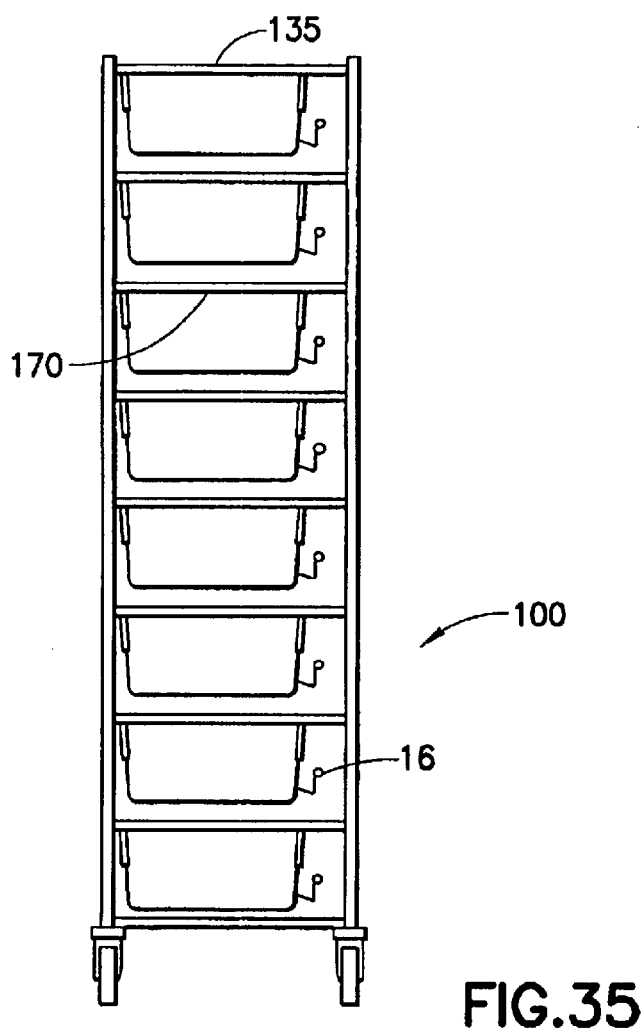
FIG. 35 is a front view of a cage locking system for securing the cages of the current invention to a single-sided rack system of the animal isolation and caging system constructed in accordance with the present invention.
Figure 36:
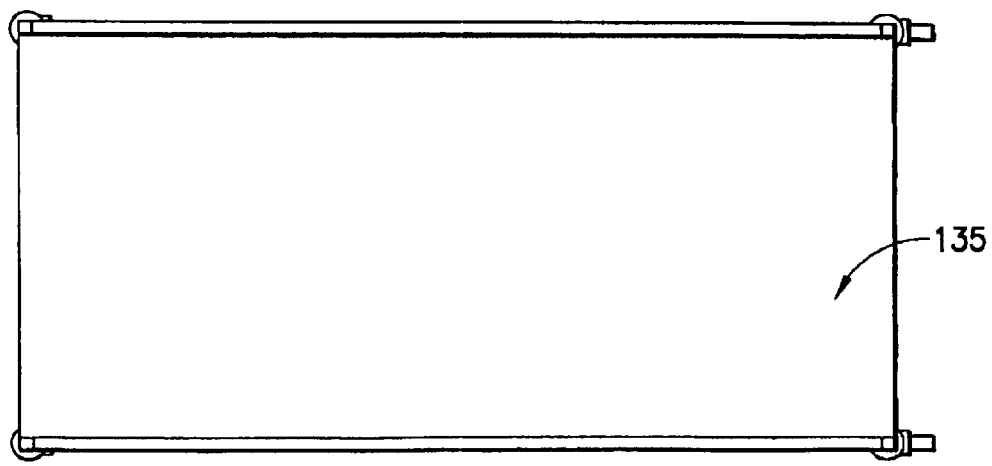
FIG. 36 is a plan top view of a cage locking system for securing the cages of the current invention to a single-sided rack system of the animal isolation and caging system constructed in accordance with the present invention.
Figure 37:
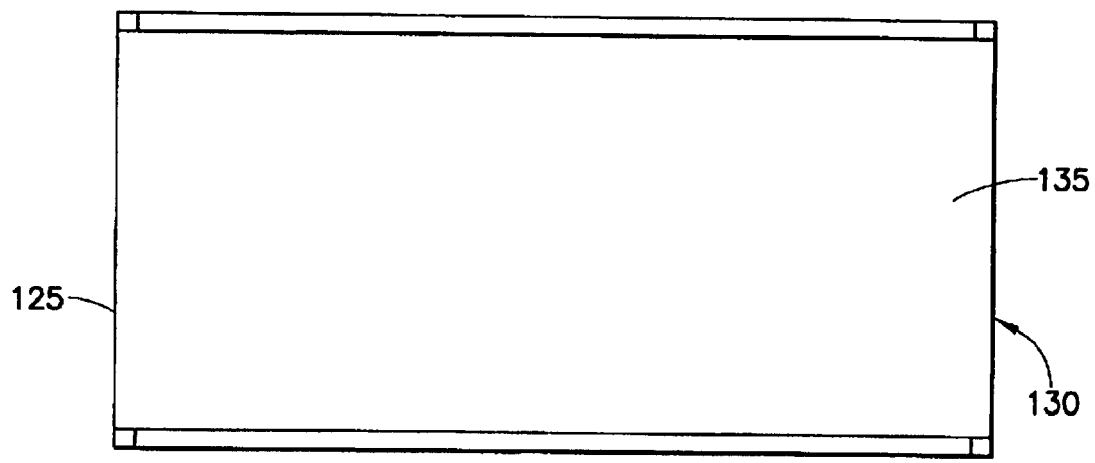
FIG. 37 is a plan top view of a double-sided rack system of the animal isolation and caging system constructed in accordance with the present invention indicating the emphasis on the use of see through materials for enhanced visual observation of the caging system and animals held therein.
Figure 39:
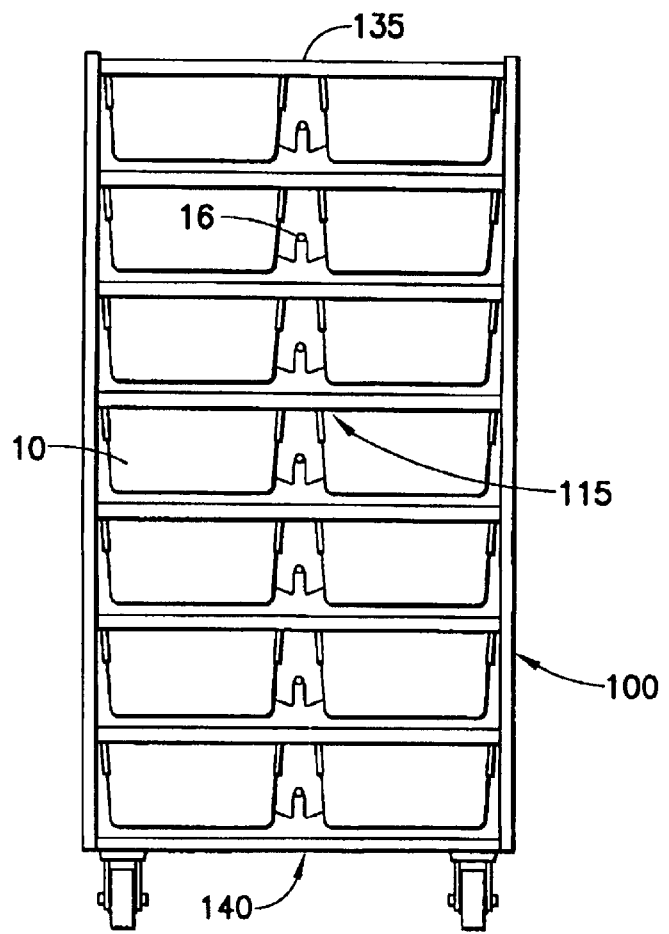
FIG. 39 is a plan front view of a double-sided rack system of the animal isolation and caging system constructed in accordance with the present invention indicating the emphasis on the use of see through materials for enhanced visual observation of the caging system and animals held therein.
Figure 38:
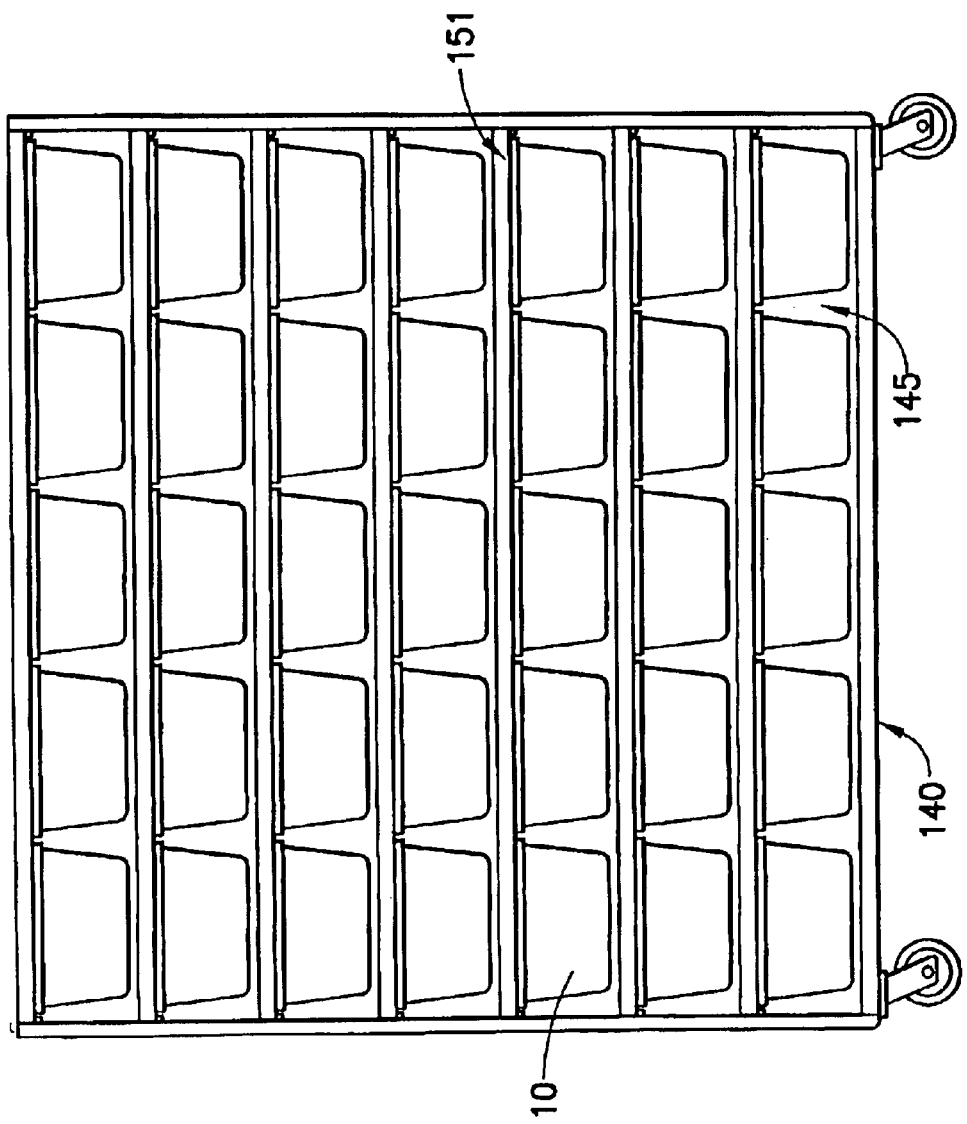
FIG. 38 is a plan side view a double-sided rack system of the animal isolation and caging system constructed in accordance with the present invention indicating the emphasis on the use of see through materials for enhanced visual observation of the caging system and animals held therein.
Figure 40:
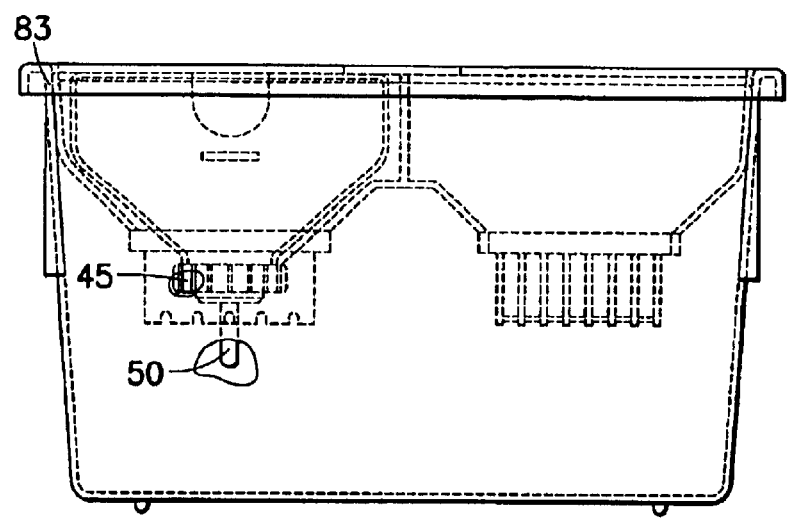
FIG. 40 is a front view of a cage body and diet delivery system of the current animal isolation and caging system indicating the emphasis on the use of see through materials.
Figure 41:
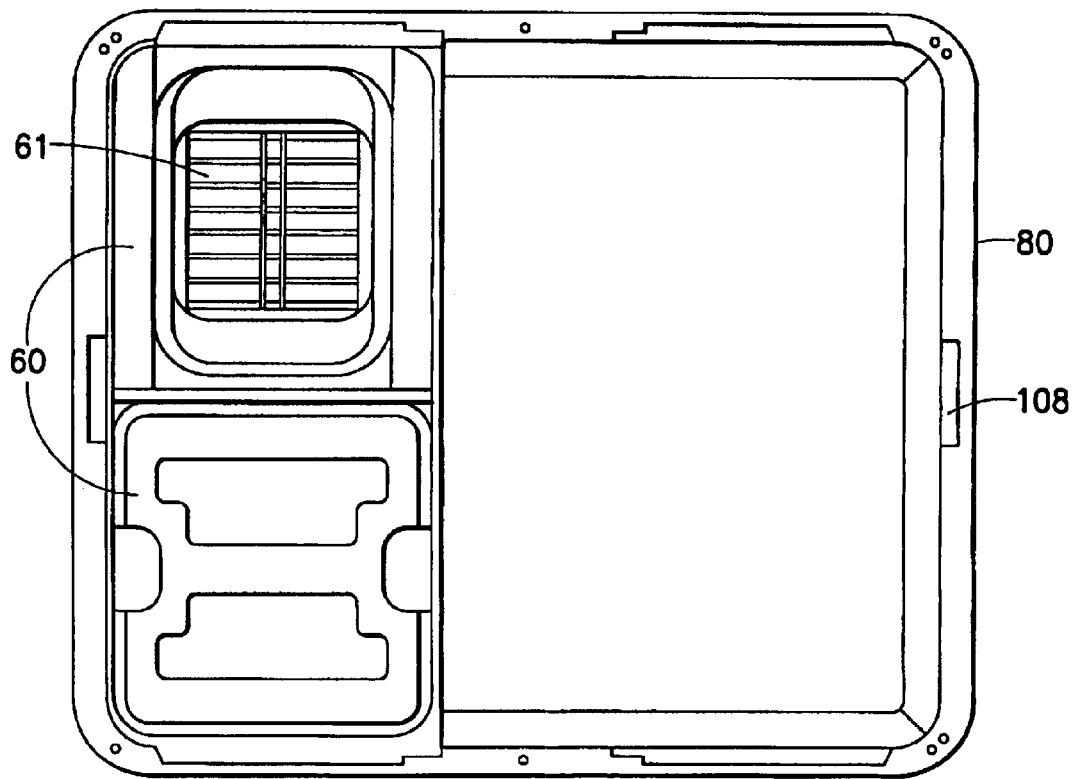
FIG. 41 is a top view of a cage body and diet delivery system of the current animal isolation and caging system indicating the emphasis on the use of see through materials, without the presence of a filter cap to enclose the interior of the cage body.
Figure 42:
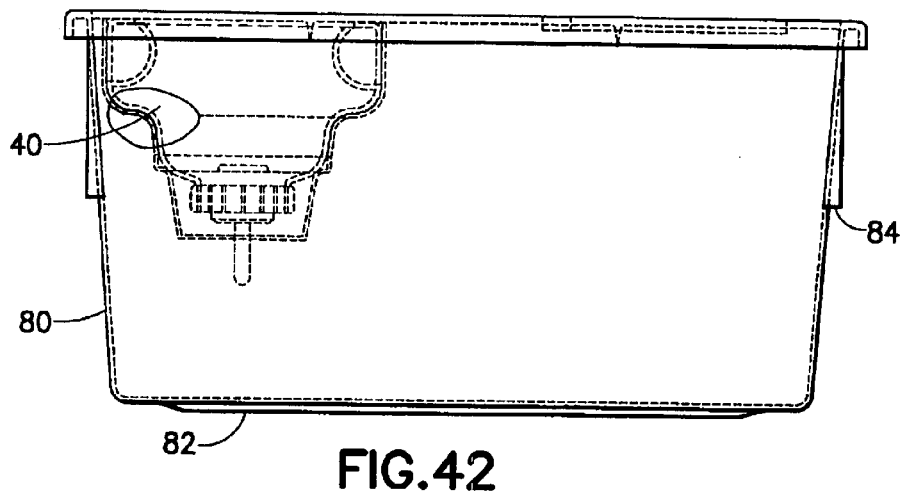
FIG. 42 is a side view a cage body and diet delivery system of the current animal isolation and caging system indicating the emphasis on the use of see through materials, without the presence of a filter cap to enclose the interior of the cage body.
Figure 43:
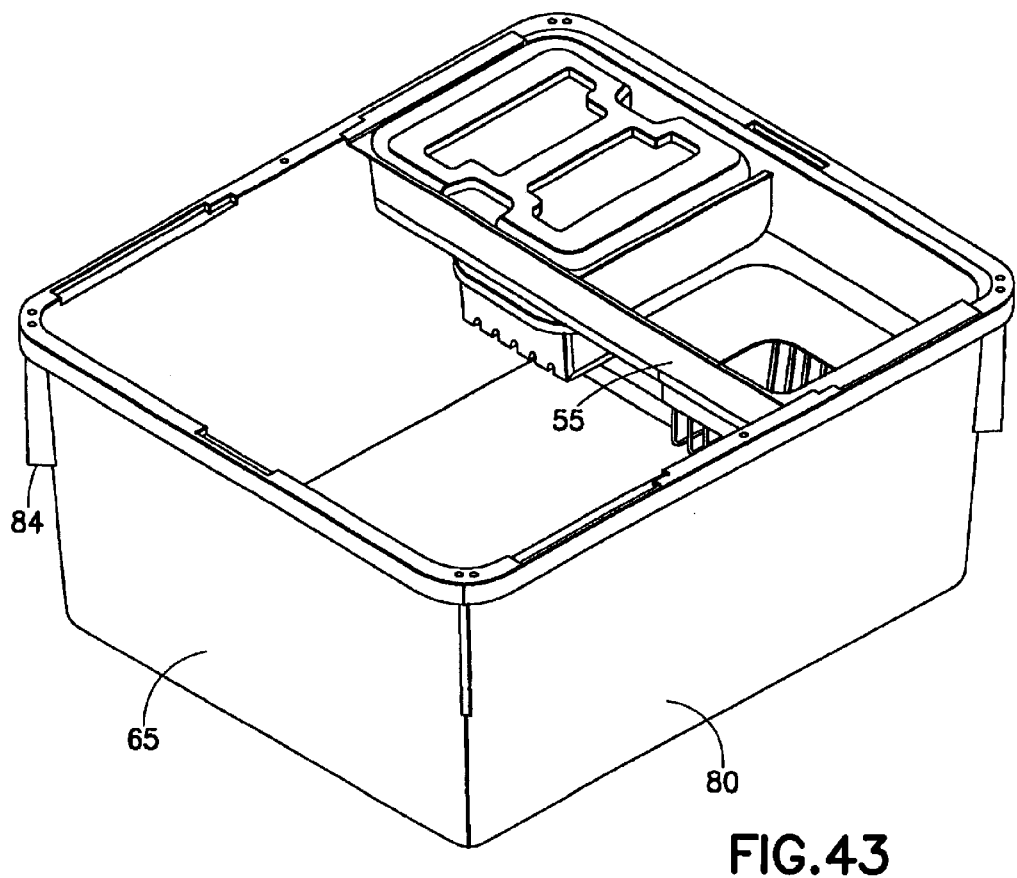
FIG. 43 is a perspective view of a cage body and diet delivery system of the current animal isolation and caging system indicating the emphasis on the use of see through materials, without the presence of a filter cap to enclose the interior of the cage body, also showing indents in cage body configuration for a rear locking tab and filter top lock respectively.
Figure 44:
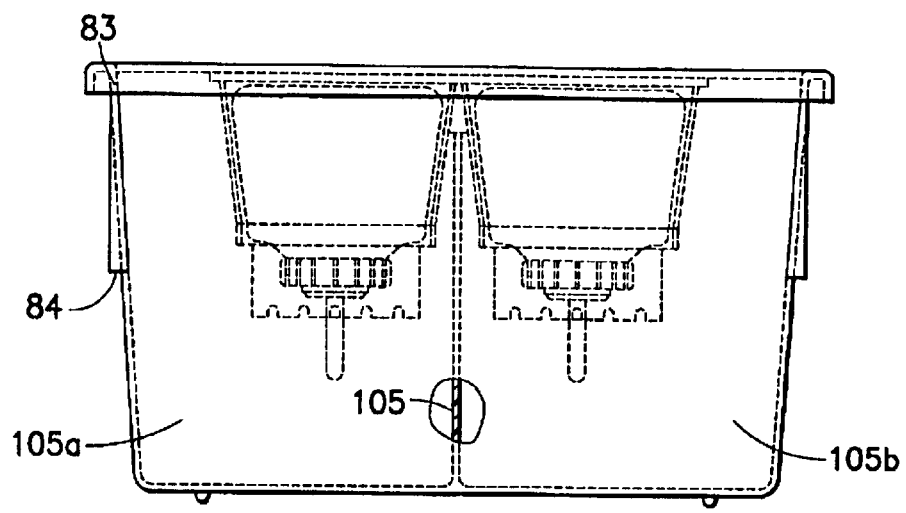
FIG. 44 is a front view of a cage body and diet delivery system of the current animal isolation and caging system indicating the emphasis on the use of see through materials, without the presence of a filter cap to enclose the interior of the cage body, also showing a divider element separating a cage of the invention into two compartments.
Figure 45:
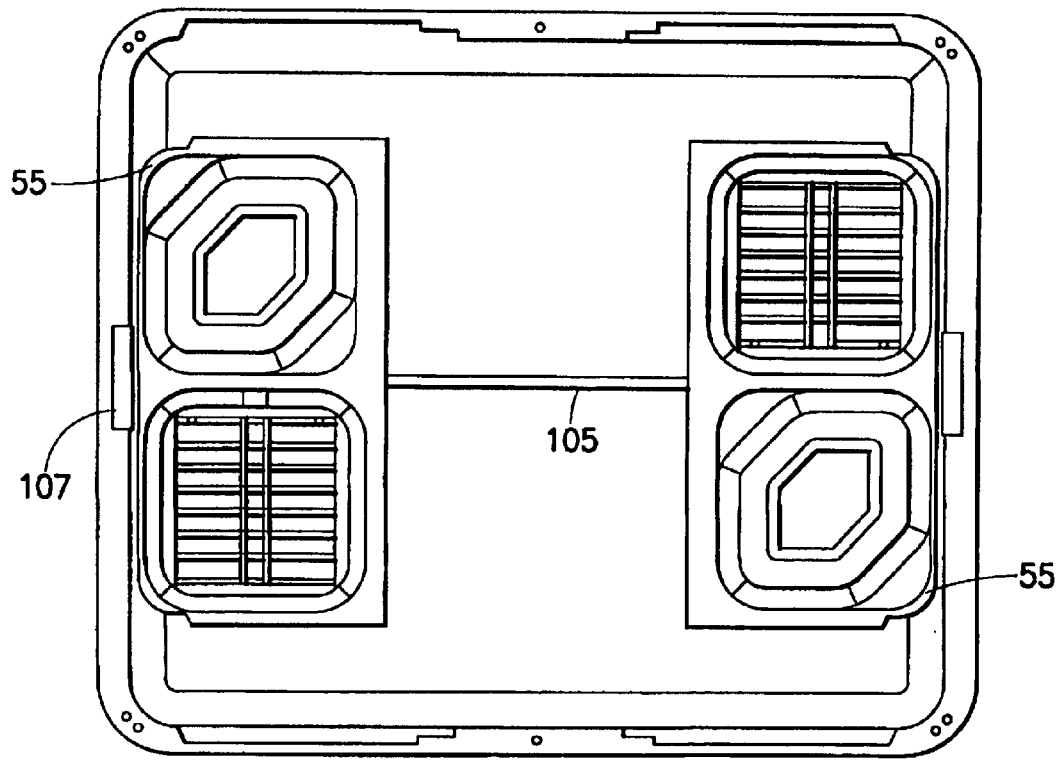
FIG. 45 is a plan top view of a cage body and diet delivery system of the current animal isolation and caging system indicating the emphasis on the use of see through materials, without the presence of a filter cap to enclose the interior of the cage body, also showing a divider element separating a cage of the invention into two compartments.
Figure 46:
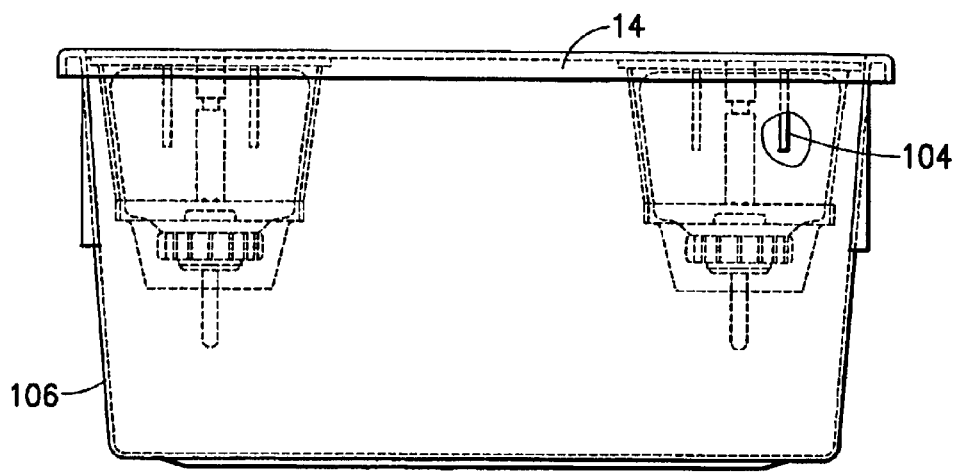
FIG. 46 is a plan side view cage body and diet delivery system of the current animal isolation and caging system indicating the emphasis on the use of see through materials, without the presence of a filter cap to enclose the interior of the cage body, also showing a divider element separating a cage of the invention into two compartments.
Figure 47:
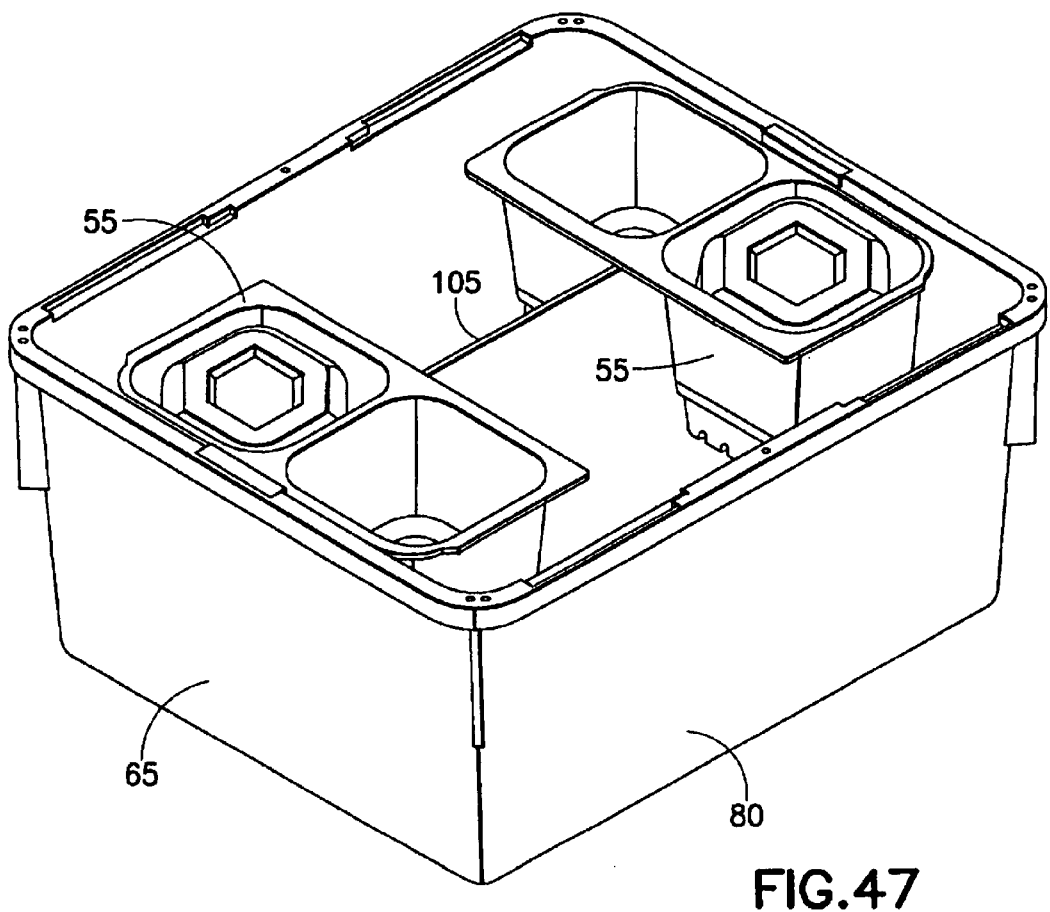
FIG. 47 is a perspective view of a cage body and diet delivery system of the current animal isolation and caging system indicating the emphasis on the use of see through materials, without the presence of a filter cap to enclose the interior of the cage body, also showing a divider element separating a cage of the invention into two compartments.
Figure 48:
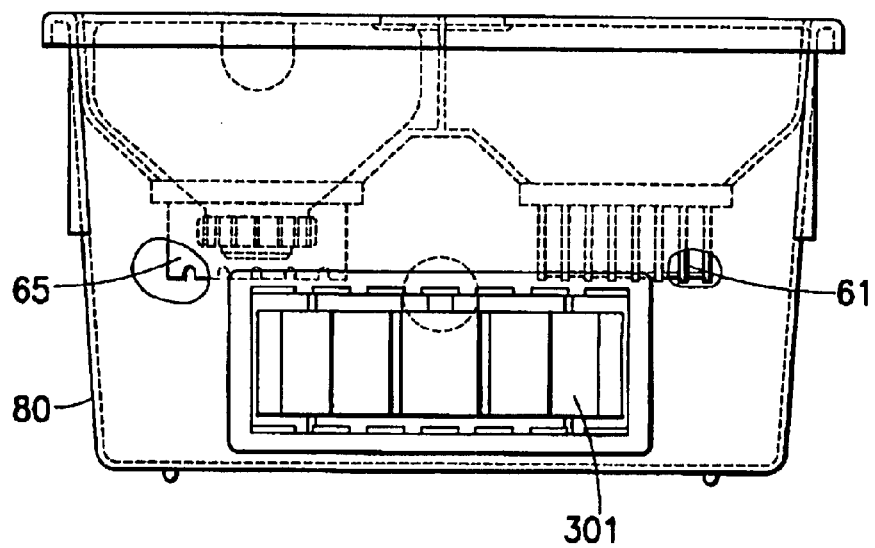
FIG. 48 is a front view of a second embodiment of the cage of the animal isolation and caging system of the invention providing a rotatable feeding mechanism, also including the optional presence of a diet delivery system of the current invention.
Figure 49:
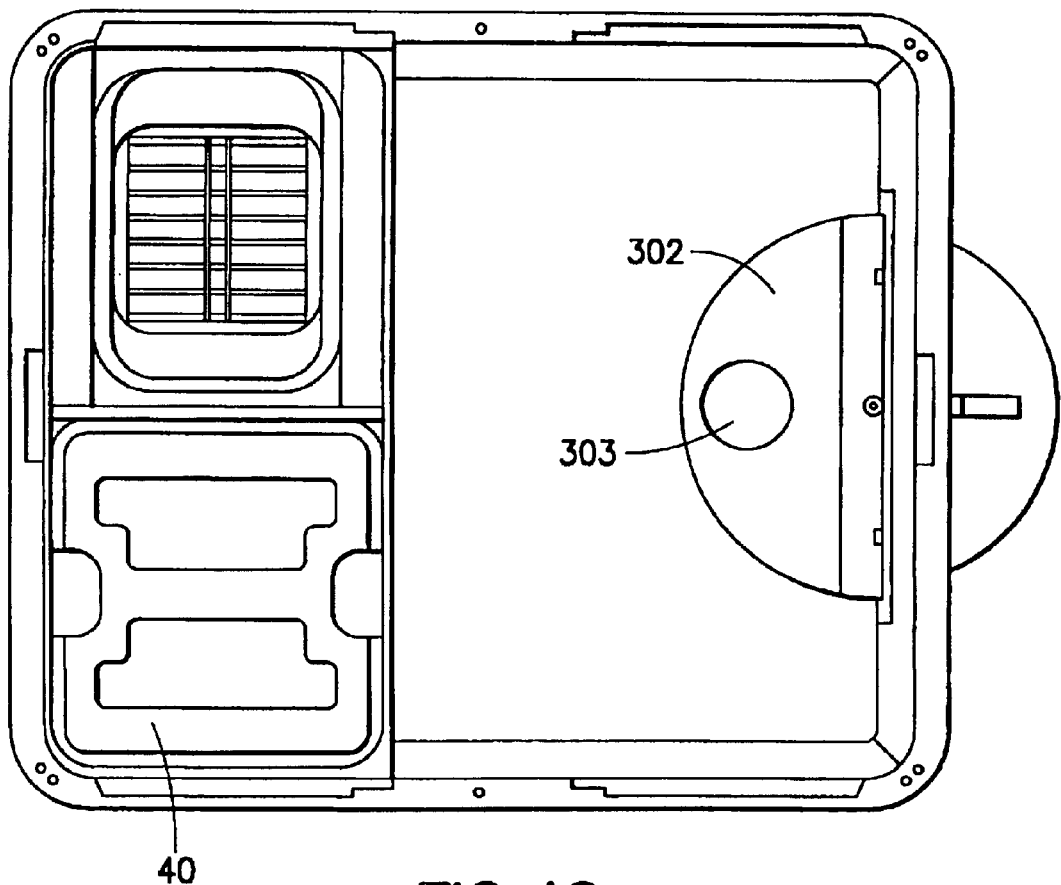
FIG. 49 is a top view of a second embodiment of the cage of the animal isolation and caging system of the invention providing a rotatable feeding mechanism, also including the optional presence of a diet delivery system of the current invention.
Figure 50:
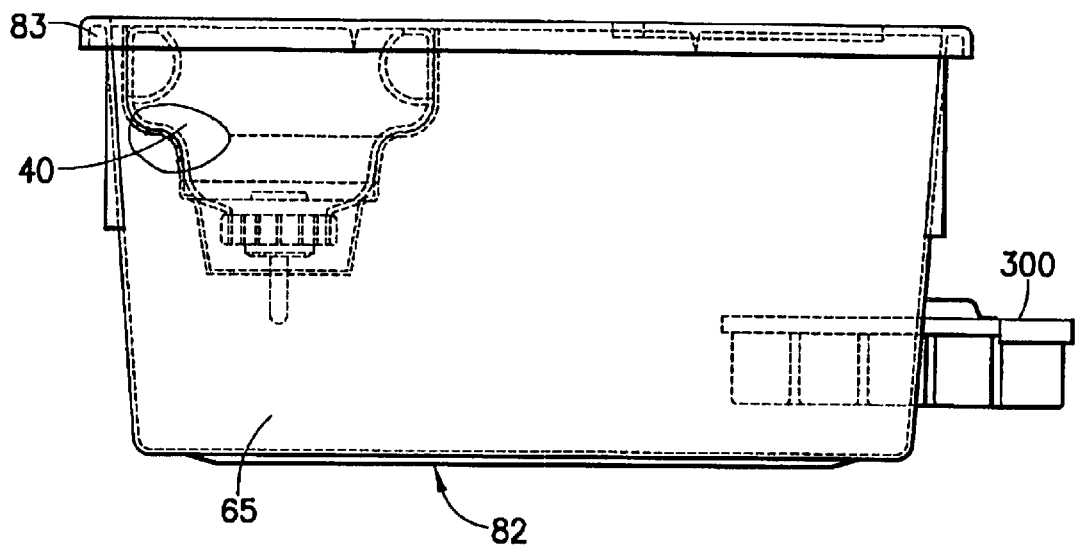
FIG. 50 is a side view, with a partial cutaway, of a second embodiment of the cage of the animal isolation and caging system of the invention providing a rotatable feeding mechanism, also including the optional presence of a diet delivery system of the current invention.
Figure 51:
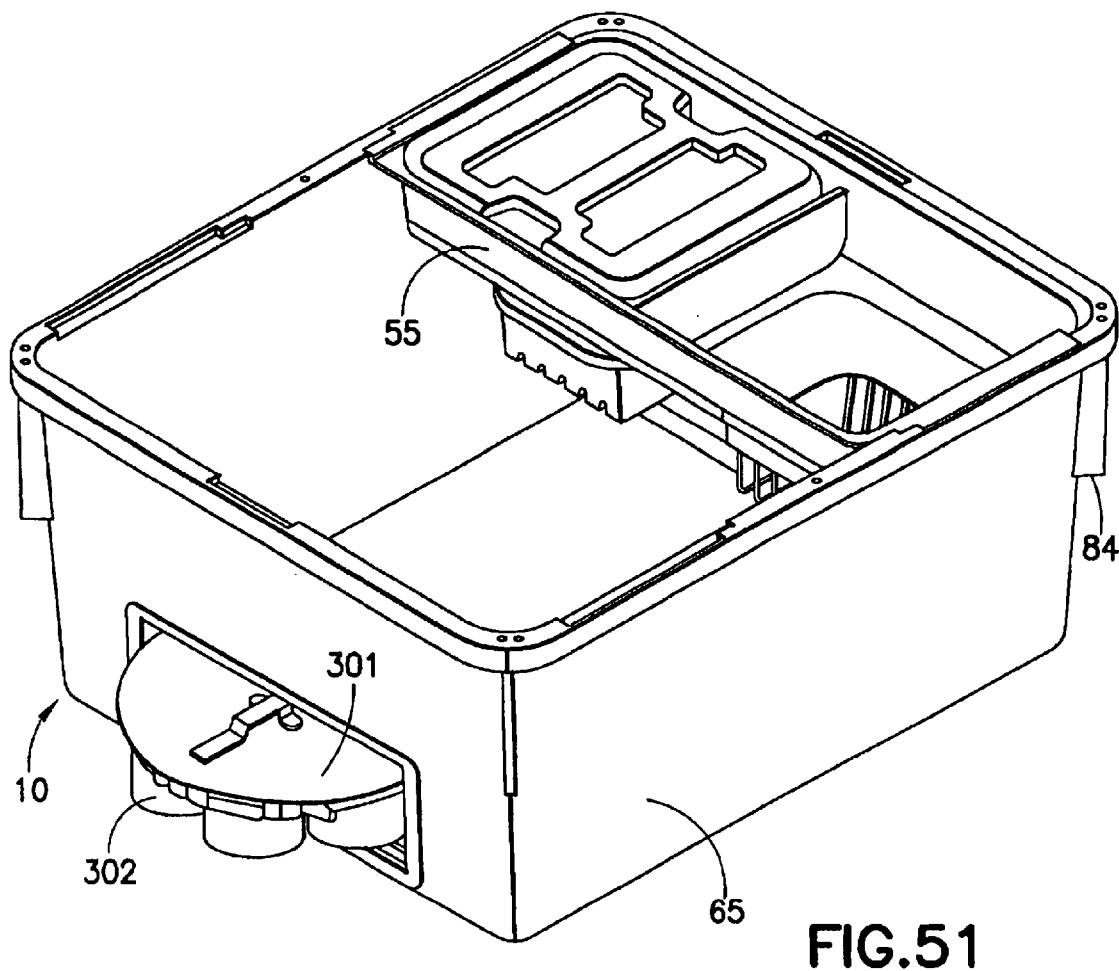
FIG. 51 is a perspective view of a second embodiment of the cage of the animal isolation and caging system of the invention providing a rotatable feeding mechanism, also including the optional presence of a diet delivery system of the current invention.
Figure 52:
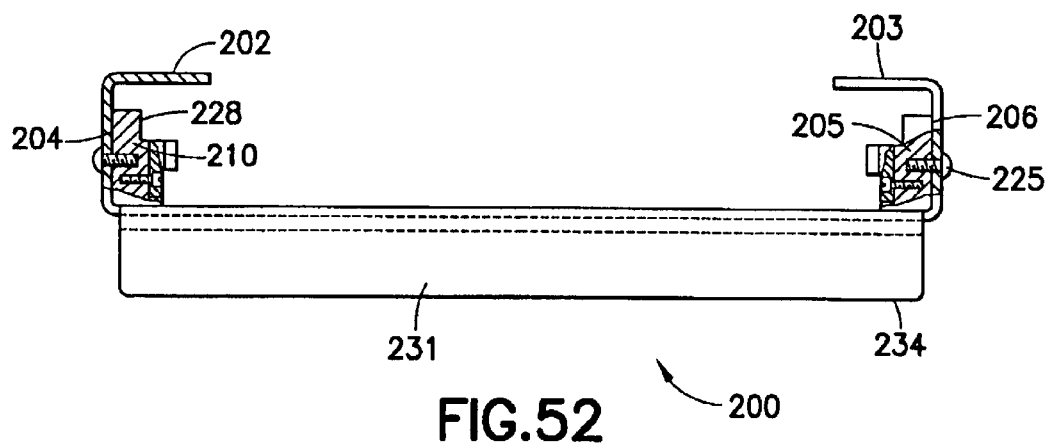
FIG. 52 is a front view of a filter removal device constructed in accordance with the present invention.
Figure 53:
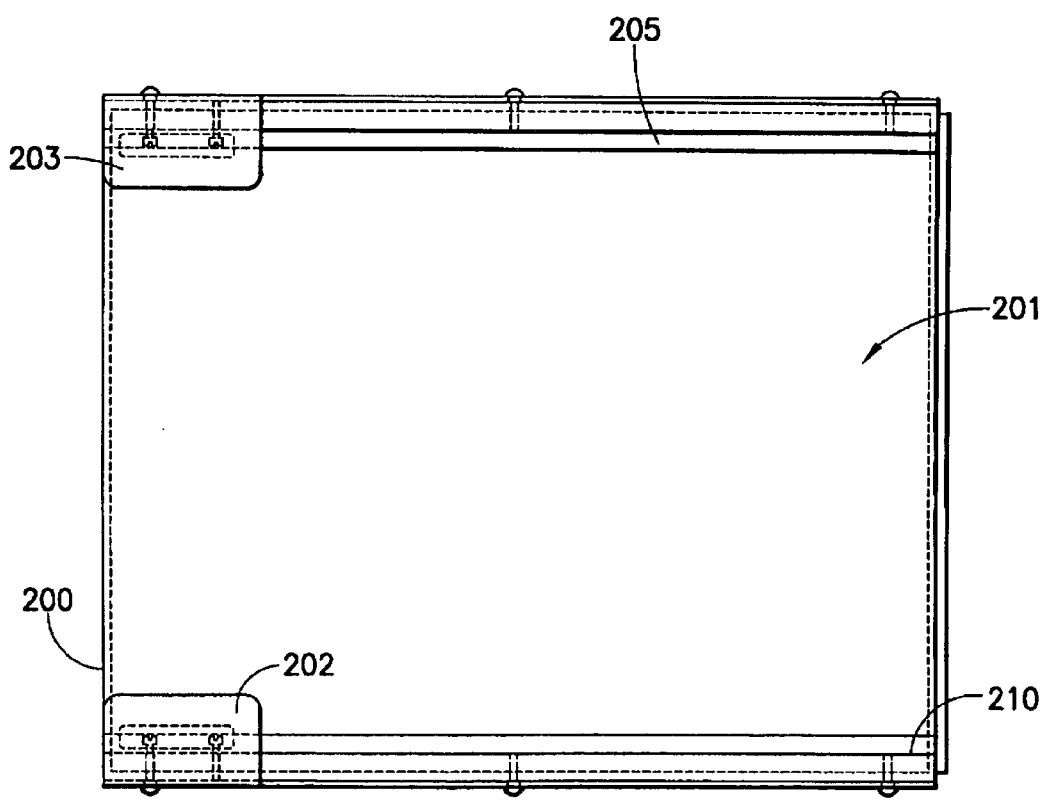
FIG. 53 is a top view of a filter removal device constructed in accordance with the present invention.

Referring in particular to FIG. 28, a cage 10 is positioned within rack 115 and coupled to an air supply plenum 110a through cage coupling 75. Blower 155 forces air into the air supply plenum 110a in the direction of arrow A, and air is consequently forced into cage 10 through cage coupling 75 in the direction of arrow B to supply air to animals within the cage assembly 10. Vacuum 160 withdraws air from air exhaust plenum 120 through canopy capture channel C into exhaust channel 95, thereby creating a negative pressure within the exhaust zone 175. Ducts 166 are formed in air exhaust plena 120 below the position at which canopy 170 is attached and communicating with gap h, permitting air in exhaust zone 175 to be drawn into air exhaust plena 120 causing a negative pressure within the space defined by peripheral lip 83 and canopy 170.

Referring to FIGS. 60–63, a first embodiment of canopy 170, generally indicated at 170a, comprises a top plate 171. Top plate 171 is attached to canopy capture element 90 and is in communication rack 115 (not shown) at an air exhaust plenum 120 (not shown). Top plate 171 has canopy capture sidewalls 172 which extend below the filter frame outer edge 33 of filter cap 11. Sidewalls 172 are disposed so as to extend underneath at least a portion of the overhang of outer edge 33 and filter cap 11.

Canopy 170a is preferably mounted to air plenum 120 at the rear and to two posts 145 at the front of rack 115. Each post 145 preferably comprises a vertical T-beam, with a first face 145a being disposed substantially parallel to the direction of insertion of a cage assembly 10 into rack 115, and a second face 145b being disposed substantially perpendicular to said direction of insertion. Each side of face 145b is provided with notches 145c for supporting canopy 170a therein. To maximize horizontal cage density within rack 115, notches 145a preferably extend as close to face 145a as possible, and face 145a of post 145 is preferably made as narrow as possible while still providing structural support for rack 115. By providing such a notched T-beam post 145 on each side of canopy 170a, canopy 170a may be supported on both sides from the front of rack 115. Other means of providing the support of posts 145 are contemplated by the invention. For example, a notched L-beam post 145 could be used, thereby providing support to only one side of canopy 170a from the front of the rack, or canopies 170a could be screwed to a flat vertical panel disposed parallel the cage insertion direction and extending from the top to the bottom of rack 115.

Accordingly, because each canopy 170 acts as both a support for the cage assembly 10 above it in rack 115 as well as a shroud over the filter cap of the cage 10 below it in rack 115 which guides exhaust air into exhaust conduit 165 from the cage 10 as well as ambient air into the air exhaust plenum 120, additional shelving is not needed to position and support cages 10 within rack 115. As a result, cages 10 may be vertically positioned closer together in rack 115 than in a rack having distinct shelving, thereby advantageously increasing the stacking density of cages 10 within rack 115.

Figure 56:
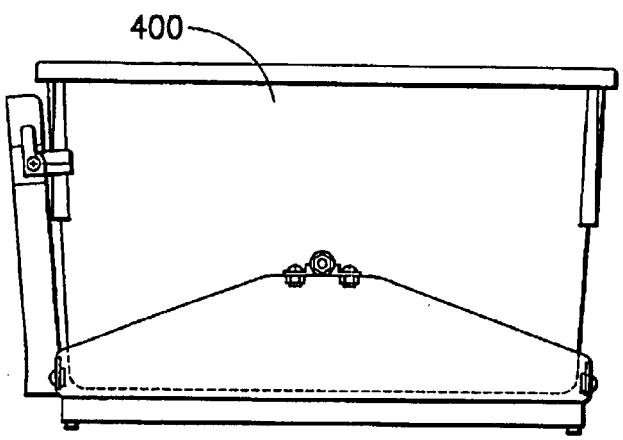
FIG. 56 is a front view of a valve charging station constructed in accordance with the present invention.
Figure 57:
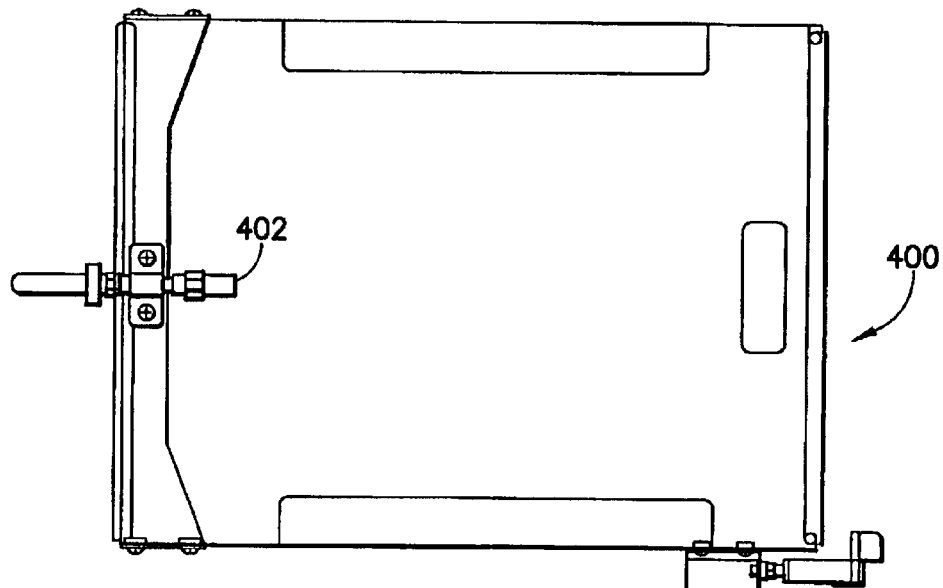
FIG. 57 is a plan top view of a valve charging station constructed in accordance with the present invention, including the valve charging stations location within the cage body of the current invention.
Figure 58:
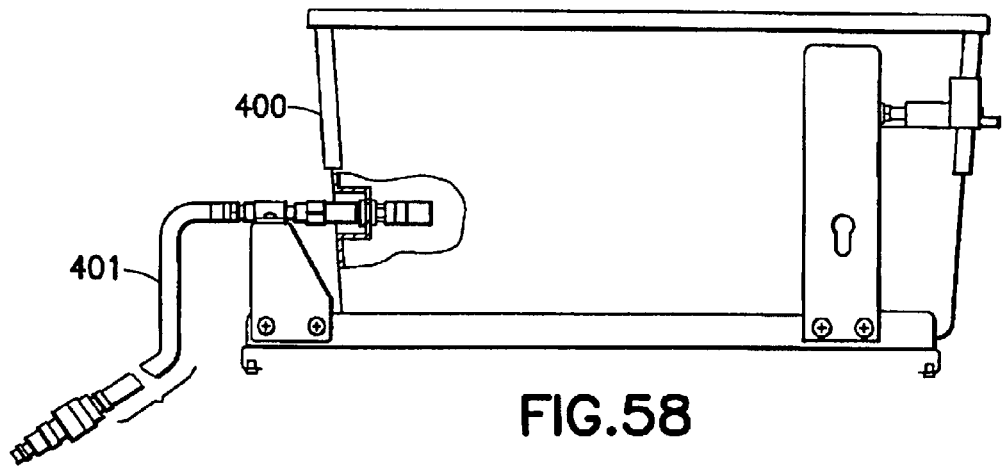
FIG. 58 is a side view of a valve charging station constructed in accordance with the present invention, including the valve charging stations location within the cage body of the current invention.
Figure 59:
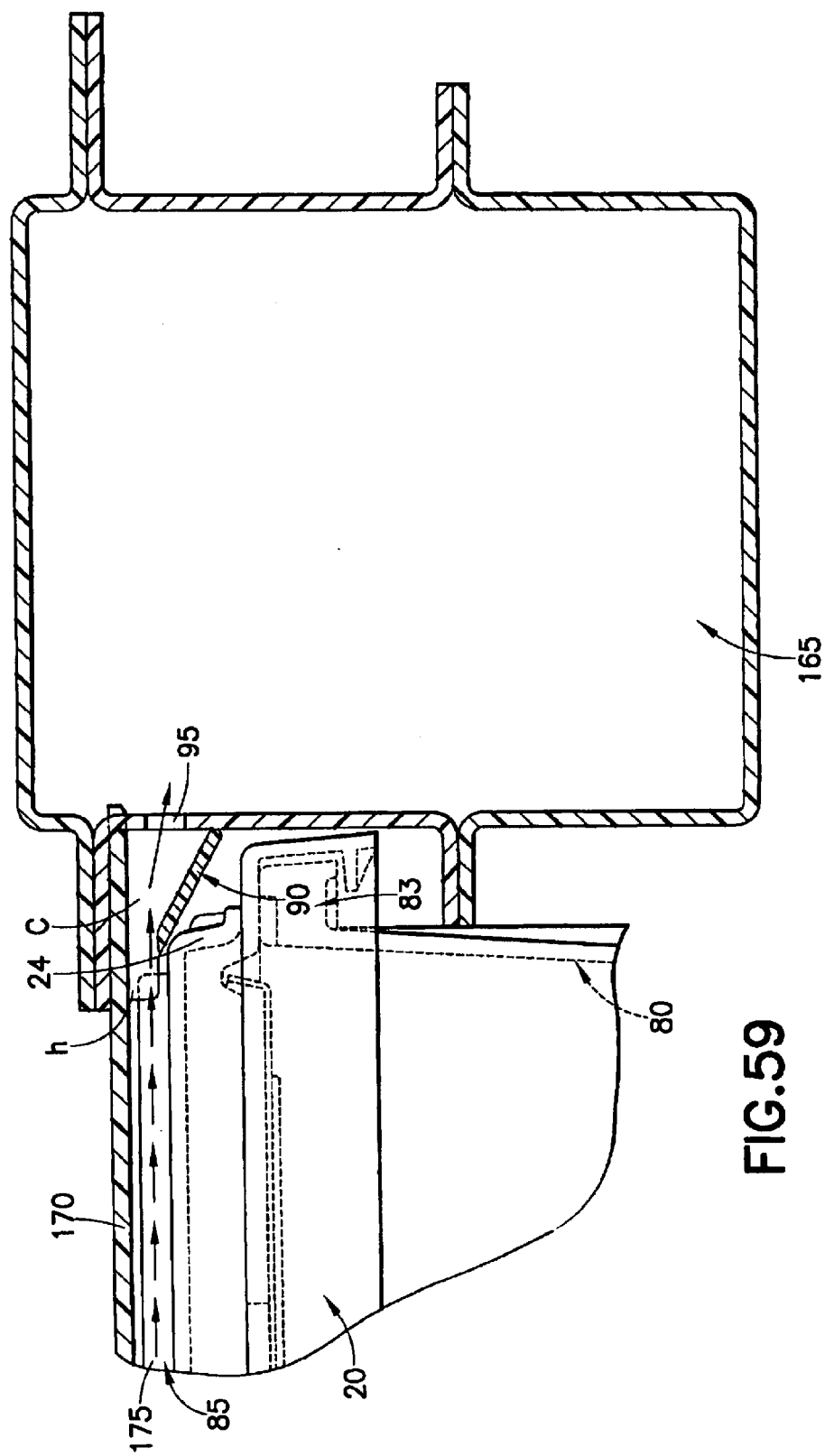
FIG. 59 is a partial cutaway view of the canopy capture system of the current invention including indications for the flow of unwanted gases and contaminants from above a cage body through a canopy capture channel into a exhaust duct.
Figure 62:
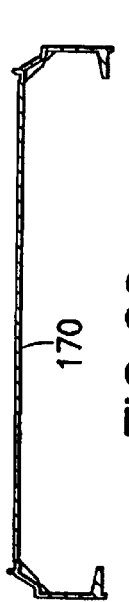
FIG. 62 is a front view of a canopy element for the rack of the animal isolation and caging system of the invention.
Figure 63:
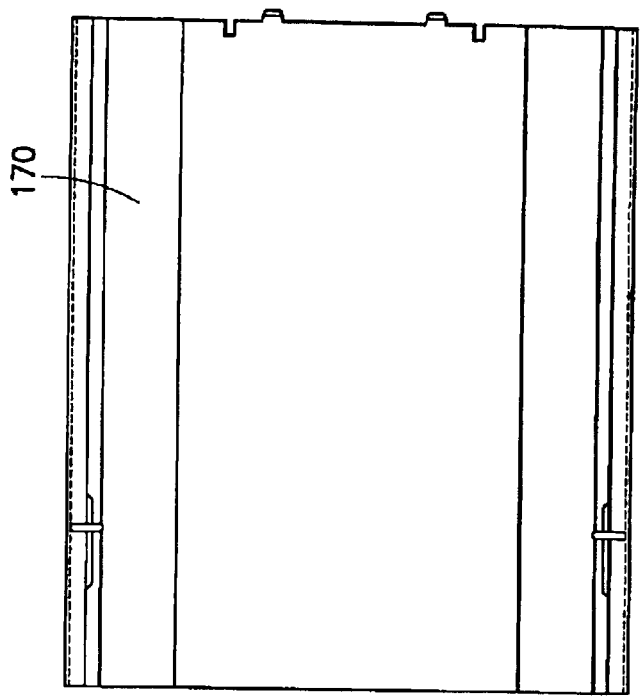
FIG. 63 is a top view of a canopy element for the rack of the animal isolation and caging system of the invention.
Figure 60:
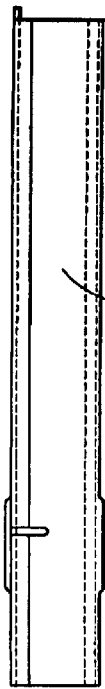
FIG. 60 is a side view of a canopy element for the rack of the animal isolation and caging system of the invention.
Figure 61:
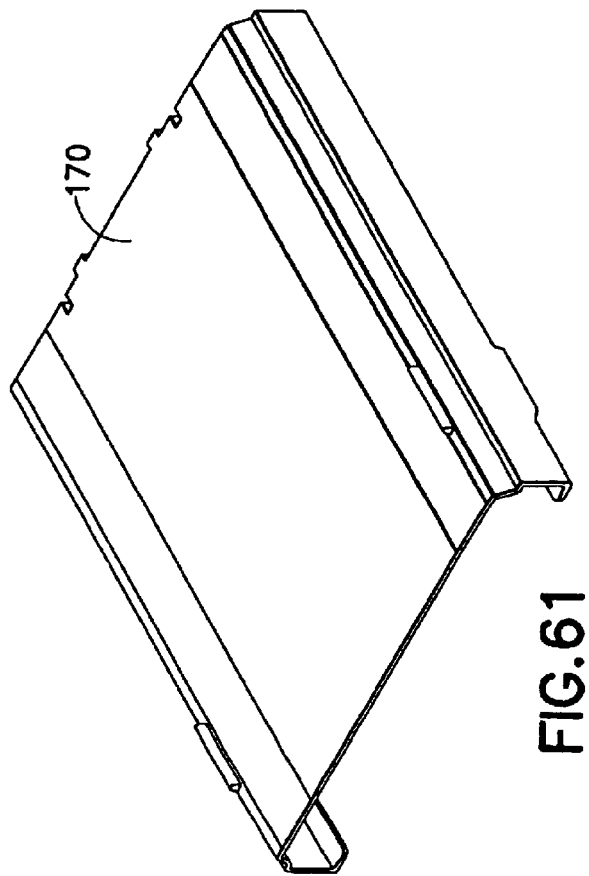
FIG. 61 is a perspective view a canopy for the rack of the animal isolation and caging system of the invention, including attachment elements for connection to a ventilated rack system of the invention.
Figure 64:
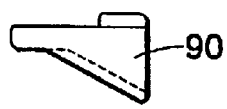
FIG. 64 is a cross-sectional view of a canopy capture channel constructed in accordance with the present invention.
Figure 65:
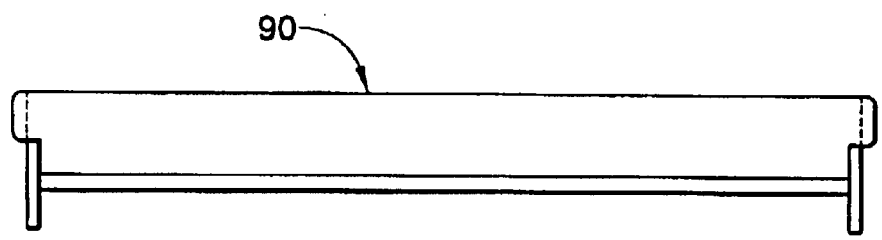
FIG. 65 is a top view of a canopy capture channel constructed in accordance with the present invention.
Figure 66:
FIG. 66 is a front view of a canopy capture channel constructed in accordance with the present invention.
Figure 67:
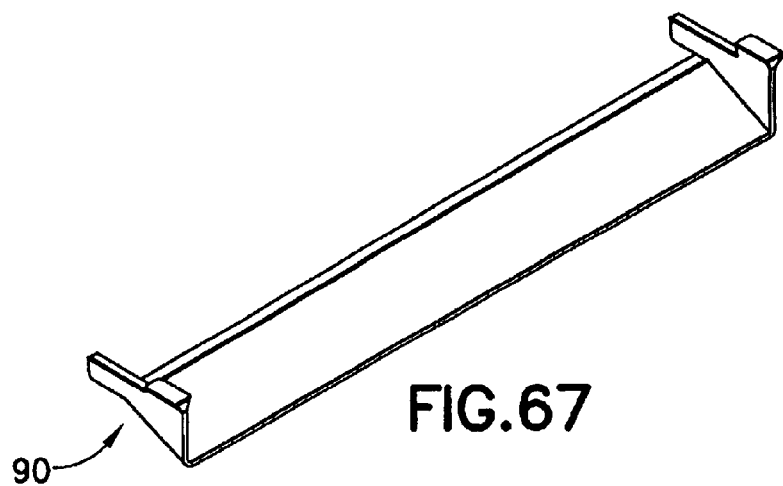
FIG. 67 is a perspective view of a canopy capture channel constructed in accordance with the present invention.

Now referring to FIGS. 56–58, an embodiment of the current invention includes a valve charging station 400 connected to rack system 100 through a air conduit 401. Charging station 400 provides for the consistent movement of pressurized air for the cage assemblies 10 of an open rack 115, through a plurality of air supply plena 110. Air moves through nozzle assembly 402. Charging station 400 may also be located integral to a rack system 100.

Filter Cap

Reference is now made to FIGS. 13–16, in which a filter cap, generally indicated at 11, for an open-top cage, such as cage 10 described above, and fitting within rack system 100 constructed in accordance with the invention is shown. Filter cap 11 is configured to cover the top of a cage floor 82 (not shown). Filter retainer 15 has a top ridge 85 which extends substantially around the top of filter retainer 15, having an exhaust channel 95 moving in the direction of Arrow D, for canopy capture element 90 to remove unwanted gases and contaminants from the cage 10 when cage 10 is incorporated in rack system 100 (not shown). Cage floor 82 may also include corner structural reinforcements 84 for added structural support and for stacking a plurality of cages bottoms (not shown).

Filter cap 11 may be formed as a layered construction including a filter retainer 15, a reusable filter 70, a filter frame 20, a chew shield 30 of layered construction 11 held together to filter frame 20 by a plurality of snap rivets 35. Snap rivets 35 may be constructed of many materials but must be durable, preferably snap rivets 35 are constructed of nylon or metal. Filter retainer 15 is preferably formed of clear plastic which is substantially rigid but permits a modest degree of flexure when torsional forces are applied thereto. As shown in FIGS. 13–16, filter retainer 15 has a perforated top wall 21 which is integrally molded with a top ridge 85 extending substantially around the top of filter cap 11. Top wall 21 is provided with a plurality of perforations 23, preferably of generally square configuration and forming a grid array. Respective opposed pairs of filter side walls 24 depend substantially orthogonally from top wall 21. The surface formed on filter retainer 15 for resting filter cap 11 on cage floor 82 includes a continuous lateral peripheral flange 88 extending generally perpendicularly outwardly from side walls 24. Lateral flange 88 serves to encompass and detachably secure to filter frame 20. Ribs 91 extend from flange 88 to allow stacking of the filter retainer 15.

Referring to FIGS. 1 and 13–16, Filter cap 11 is also provided with a filter frame 20. Filter frame 20 is preferably formed of material having the same properties as those of filter retainer 15 described above but with a different rigidity. Filter frame 20 detachably and securely maintains an air filter 70 (not shown) to the undersurface of top wall 21. Filter frame 20 includes a generally flat perforated top wall 31. Top wall 31 includes a substantially rectangular body portion 32. An outer flange 33 of body portion 32 depends from filter frame 20. A continuous peripheral flange 34 depends from outer peripheral flange 33.

In FIG. 16, flange 33 is spaced from, encompasses and overhangs lip 83 of cage body 65 (not shown). Thus, filter cap 11 cannot be inadvertently dislodged from cage body 65 and must be lifted off to be removed. It should also be noted that the clearance space between flange 33 and lip 83 should permit only a slight movement of filter cap 11 on cage body 65. However, outer flange 33 is preferably of sufficient lateral extent to remain in contact with lip 83 despite any relative lateral movement between filter cap 11 and cage body 65, thereby maintaining the integrity of the "petri dish" configuration between filter cap 11 and cage body 65 to form an enclosed caging system 10 capable of housing at least one animal.

To prevent animals placed within cage assembly 10 from damaging the cage or any of filter cap 11's components the current invention provides chew shield 30 integrally connected to the underside of filter frame 20 by the use of a plurality of snap rivets 35. Chew shield 30 is designed to allow the passage of air and other gasses but to prevent any animals from within cage 10 from gaining purchase on other components of the filter cap 11. Chew shield 30 is preferably constructed of metal and extends into the upper area of cage body 65 inside sidewalls 80 to reduce any lateral movement of filter cap 11 relative to cage body 65.

In a preferred embodiment, air filter 70 is a thin sheet of spun-bonded polyester of the type sold by DuPont under the trademark REEMAY 2024. A filter thickness of between 10 and 15 millimeters has been found adequate for a filter having an area approximately equivalent to the area of filter retainer top wall 21. Air filter 70 is mounted on the top surface of filter frame 20 and is held in place by filter retainer 15 in a manner to be now described. REEMAY 2024 is used by way of example only and any filter medium having at least its properties or similar properties may be utilized.

Now referring to FIGS. 68, to assemble filter cap 11, air filter 70 is placed against the top wall 31 of filter frame 20 of filter cap 11. Thereafter, filter retainer 15 is mounted atop filter frame 20. Ribs 91, 98, 112, 114, 116 interlock such that rib 97 projects between ribs 112 and 114, while rib 98 projects between ribs 114 and 116 (not shown). Ribs 97, 98, 112, 114, 116 thus also serve to hold filter 70 securely in place against the top surface of top wall 31. Top wall 31 of filter frame 20 is provided with perforations 34 which are preferably substantially coextensive and in alignment with perforations 23 in top wall 21 of filter retainer 15 when filter frame 15 is mounted atop filter frame 20. The mesh structure of top wall 31 serves to prevent air filter 70 from sagging and holds air filter 70, while filter frame 20 holds filter 70 securely in place against the top surface of top wall 21. In the assembled filter cap 11, perforated top wall 21 overlies filter 70 to protect the filter 70 against damage during handling and prevent its movement or buckling, while filter 70 rests flush upon perforated top wall 31 of filter frame 20 which supports and protects air filter 70 in its mounted position. Additionally, touching the filter 70 with fingers may destroy the filter integrity, and therefore the perforated walls 21 or 31 respectively on either side of the filter 70 prevent contact with the filter by the technician during handling and also prevents contact with the filter by the animal. The lower region of filter cap 11 is further protected from animal damage by the use of chew shield 30. Chew shield 30 being attached to filter frame 20 through the use of a plurality of snap rivets 35 (not shown).

Filter retainer 15 is held in place by means of small projections or detents 51 which are integrally molded on the outer surface of filter frame body 32. As shown in FIG. 69, four spaced detents 51 are molded on each long side filter frame body 32 of filter cap 11, and two spaced detents 51 are molded on each shorter filter frame body 32. Each of the detents 51 has a convex or arcuate free end, as shown in FIG. 71. Similarly, apertures or slots 52 are formed in filter frame body 32 of filter frame 20 which are positioned and dimensioned so as to snugly receive detents 51 when filter retainer 15 is mounted on filter cap 11. In an alternative embodiment, detents 51 could be formed on the inner surface of filter frame body 32 of filter frame 20, while slots 52 would be formed in side walls 53 of filter cap 11. It is also possible to dimension filter retainer 15 to be held to filter frame 20 by a tension fit.

Detents 51 are precisely molded on filter frame 20 and are spaced from the top surface of peripheral flange 88 by a distance slightly greater than the height of integral peripheral flange 89 of the filter frame 20. After air filter 70 has been positioned against the bottom surface of top wall 21, filter retainer 15 is moved downwardly upon filter frame 20 toward the perforated top wall 21 thereof to permit detents 51 to engage slots 52. Filter frame body 32 of filter frame 20 flex outwardly so that slots 52 snap past tabs 53 to the mounted position shown in FIG. 68. In this mounted position, the top surface of lateral peripheral flange 89 is held beneath the bottom surface of detents 51 and is restrained thereby, with ribs 112, 114 and 116 on the upper surface of filter frame outer edge 33 engaging the lower surface of the edge portion of air filter 70 and pressing this filter portion against the lower surface of filter retainer top wall 21. At the same time, the meshed structure of perforated top wall 31 of filter frame 20 engages the lower surface of air filter 70 and presses filter 70 firmly against the lower surface of top wall 21 of filter retainer 15. Air filter 70 is thus sandwiched between filter retainer 15 and the top surface of top wall 32 of filter frame 20, and may be retained in this mounted position by the engagement of detents 51 with filter retainer 15.

Filter retainer 15, filter frame 20 and air filter 70 may thus be firmly locked in a mounted position so that they cannot be accidentally dislodged during autoclaving or handling. An assembled filter cap 11 can thus be lifted and removed from cage body 65 for all normal functions such as feeding, treating or examining animals therein without disturbing or dislodging air filter 70.

Filter Removal Device

Referring to FIGS. 52–55, when it becomes necessary to replace or remove filter 70 from filter cap 11, another of embodiment of the current invention provides a filter removal device 200, constructed in accordance with the invention is shown. Filter removal device 200 includes a base board 201, and a first guide support 205 and a second guide support 210 mounted thereon in facing relationship. A respective separator 202, 203 is mounted on an outer surface of a respective guide support 204, 206.

Base board 201 is formed with left slots 215 and right slots 220. A plurality of screws 225 (of which one is shown) extend through a respective one of slots 215, 220 or 221 and affix guide support 205 and guide support 210 to base board 201. Slots 215 and slots 220 extend for a length along the width of base board 201 to allows screw 225 to slide within slots 215, 220 to adjust the position of guide supports 205, 210 relative to each other. In a preferred embodiment, each of slots 215, 220 and 221 has a length of ⅛ of an inch allowing each guide support 205 and guide support 210 to be moved towards the other or away from the other by ⅛ of an inch to accommodate a variety of filter caps 11 and cage bodies 65. Mounting holes 226 may be formed within base board 201 to mount base board 201 at a desired location of a work bench, table or the like. In a preferred embodiment, base board 201 is formed of bakelite.

Guide supports 205 and 210 are substantially L-shaped when viewed on end and have a side wall 227 and 228 respectively. A slide surface 230 is formed at the top of side walls 227 and 228. An inner guide surface 229 extends substantially orthogonally from slide surface 230 to provide a corner along the length of guide support 205. Similarly, guide support 205 has a side wall 227, a slide surface 230 and an inner guide surface 229.

A separator 231 includes a top 232 and a tapered surface 233 extending towards top 232 to form a substantially rectangular front end 234 of separator 231. Separator 231 is affixed to side wall 227 by screws 199 at a position in which top 232 is substantially co-planar with slide surface 230. Separator 231 is affixed in a similar manner. Guide supports 205, 210 define a slide path for a cage top from which a filter retainer is to be separated. Guide supports 204, 205 are positioned so as to define a distance therebetween substantially equal to the width of the filter retainer. In a preferred embodiment, support guides 205, 210 are made of plastic while separators 231, are made of machined aluminum.

During operation, a filter cap is placed on guide support 205 and guide support 210 in an inverted position so that the filter cap 11 is in facing relationship with base board 201 (not shown). The skirt of the cage top rests on slide surfaces 230, 240. The cage top is slid along slide surfaces 230, 240 in the direction of arrow B towards the separating edge 241 of separators 231, 242. Because the skirt slides along slide surface 230, 240 and because separators 231, 242 are substantially coplanar with slide surface 230, 240 separator edge 241 is substantially disposed at the position where the filter retainer meets the cage top, acting as a wedge to separate the filter retainer from the cage top as the cage top is slid along the cage top slide path. Once a complete pass has been made by the cage top, the filter retainer will fall to the surface of base board 201 allowing for easy removal of the filter which had been previously retained between the filter retainer and cage top.

In providing a filter frame for an open-top cage with a perforated filter retainer which snaps onto a similarly perforated filter frame, a filter cap for an animal cage top provides a filter that may be easily and quickly changed. By providing the filter above the perforated top wall of the filter frame, the filter may be replaced while the filter frame is on the cage to ensure that animals within the cage are not permitted to escape while the filter is being replaced. In addition, the substantially rigid chew shield attached to the underside of the filter frame protects the filter cap from damage caused by animals within the cage. Moreover, by securing the filter retainer to the filter frame and thusly to the chew shield with an integrally formed attachment means, such as tabs and slots, no special tools are necessary to remove the filter retainer or for replacing the filter.

Cage Dimension

Figure 3:
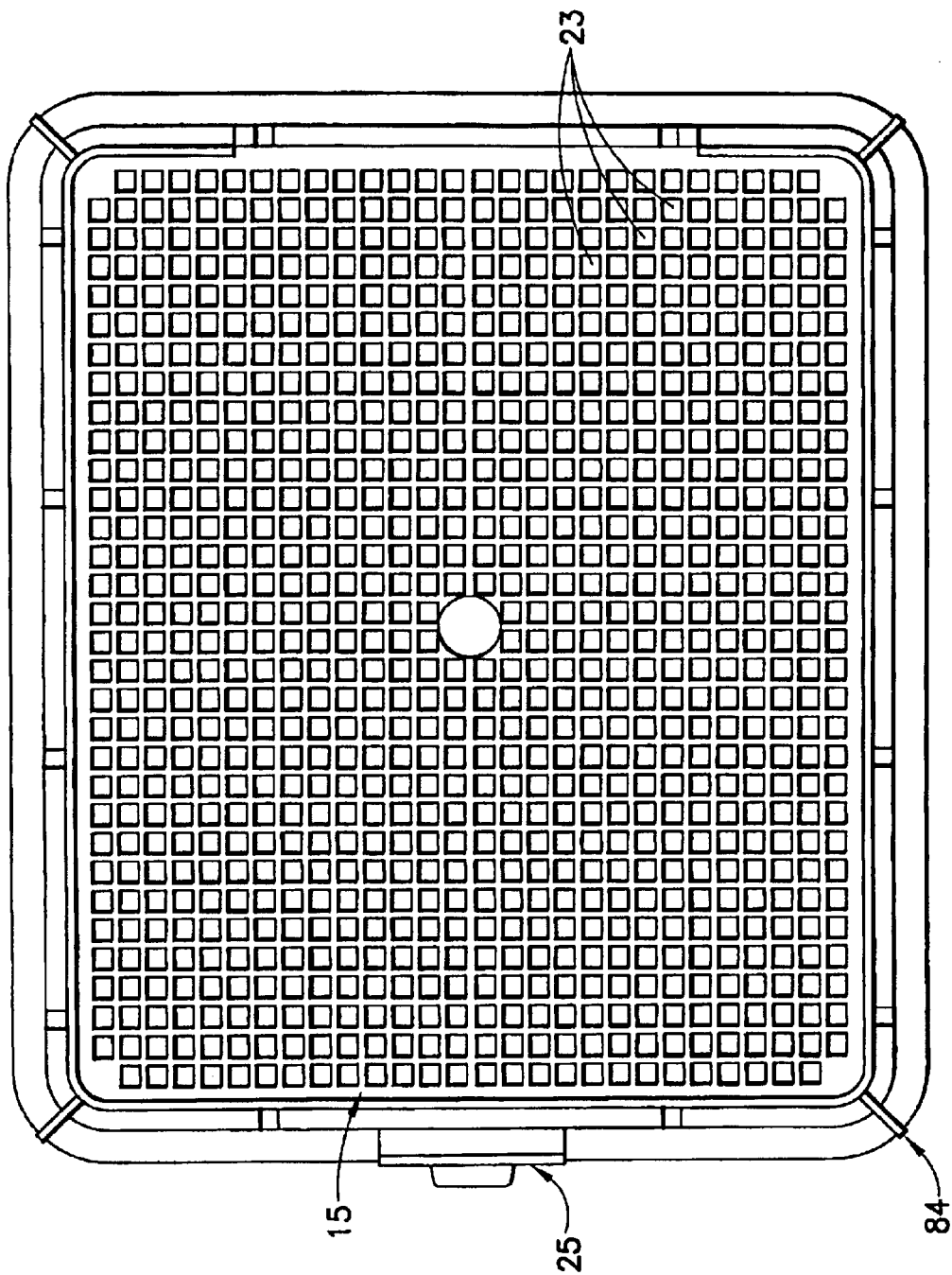
FIG. 3 is a top view of a filter cap in accordance with the current invention.
Figure 5:
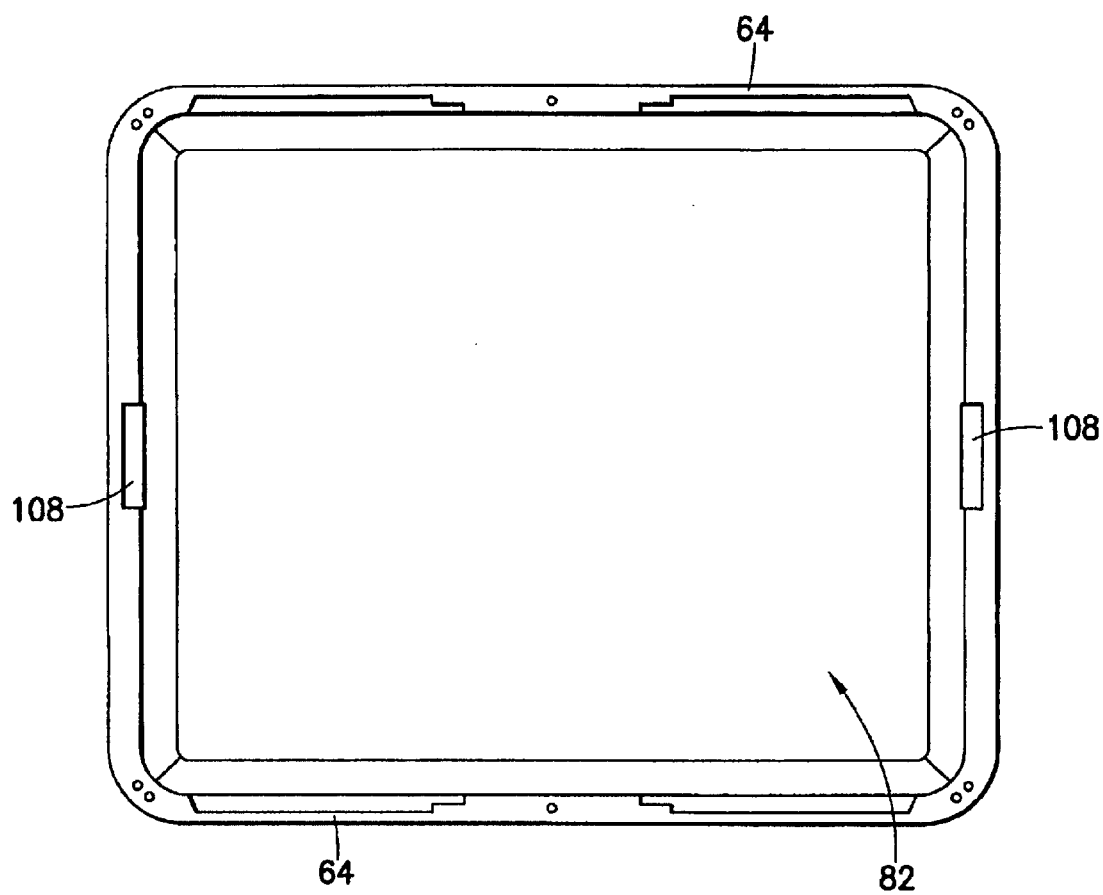
FIG. 5 is a top plan view of a cage body of the current invention.
Figure 6:
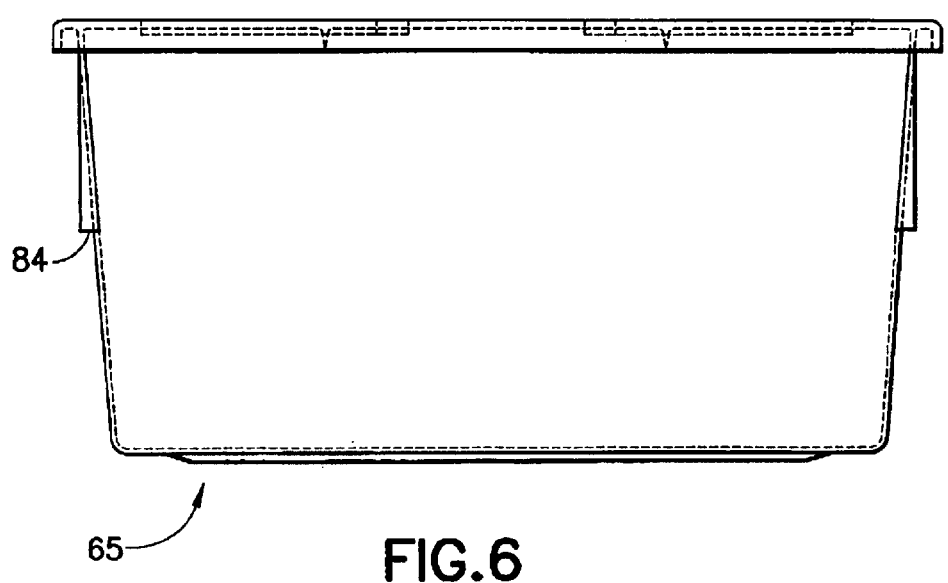
FIG. 6 is a side plan view of a cage body of the current invention.
Figure 7:
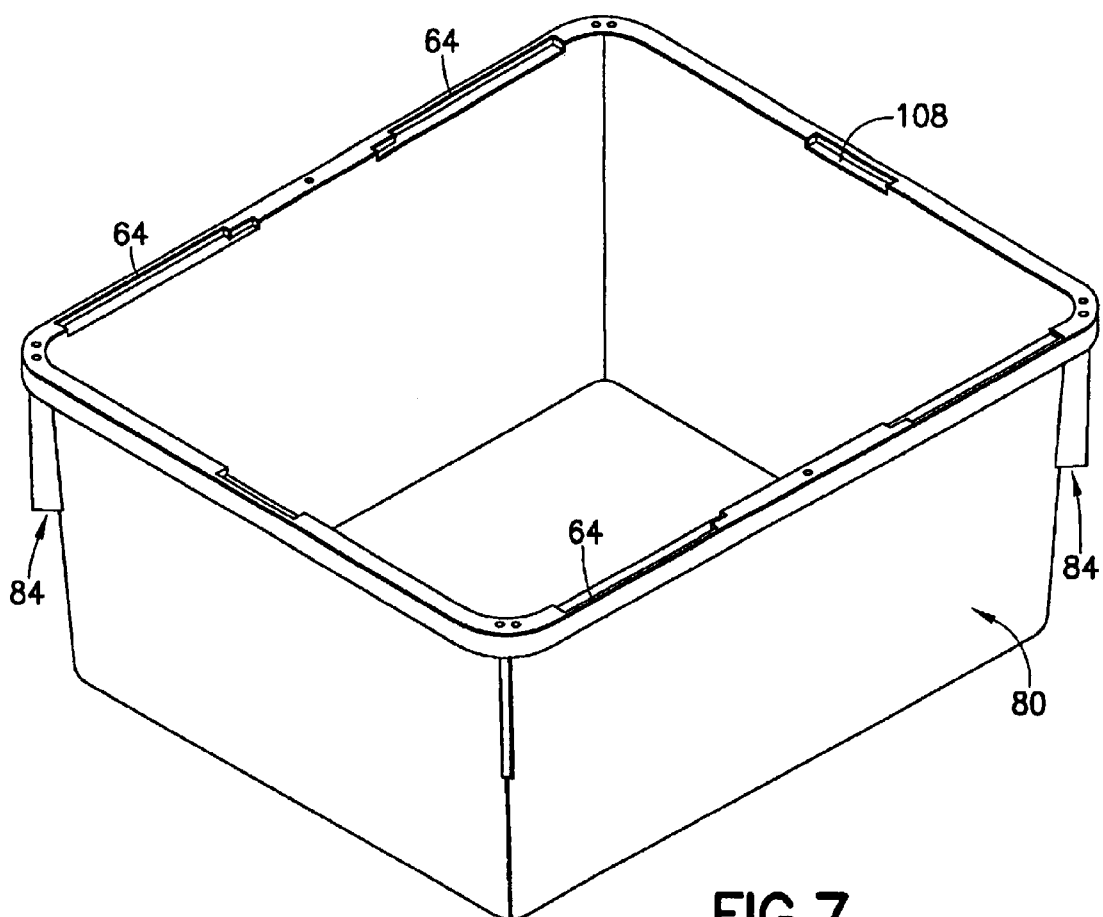
FIG. 7 is a perspective view of a cage body of the current invention.
Figure 8:
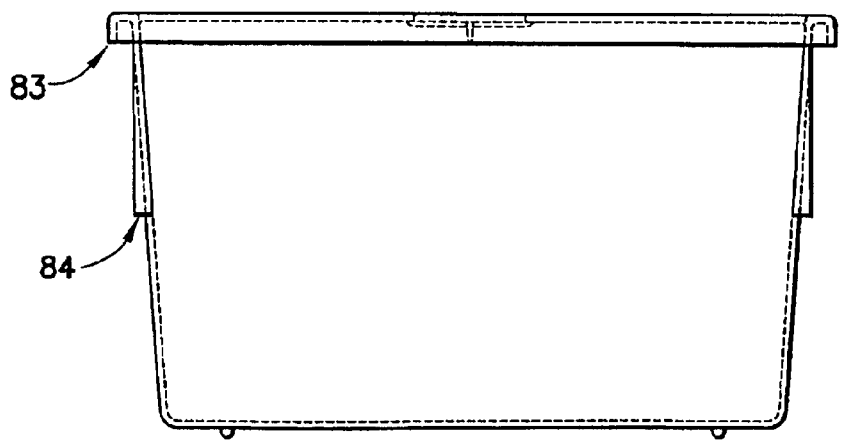
FIG. 8 is a side view of a cage body of the current invention.
Figure 11:
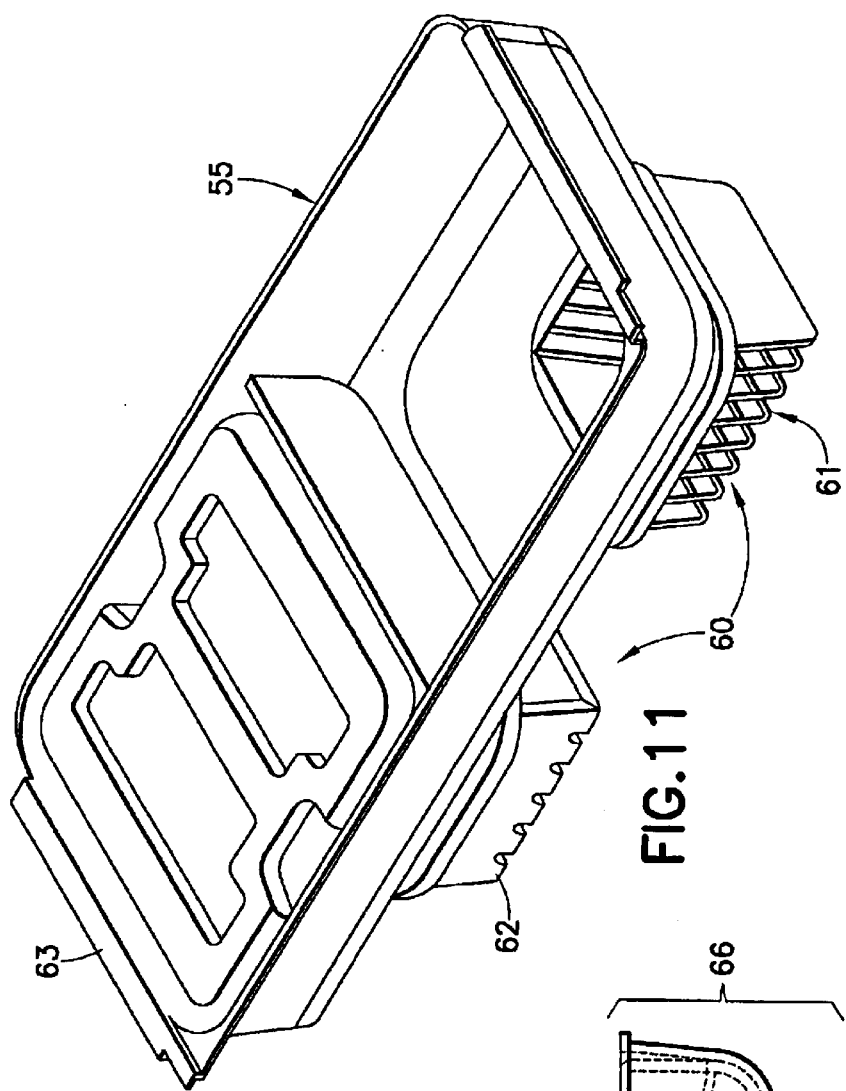
FIG. 11 is a perspective view of a diet delivery system of the invention including water bottle with sipper tube.
Figure 12:
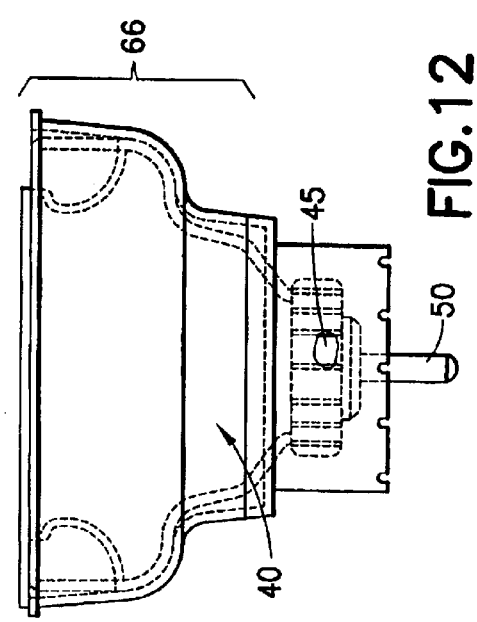
FIG. 12 is a side plan view of a diet delivery system of the invention.
Figure 13:
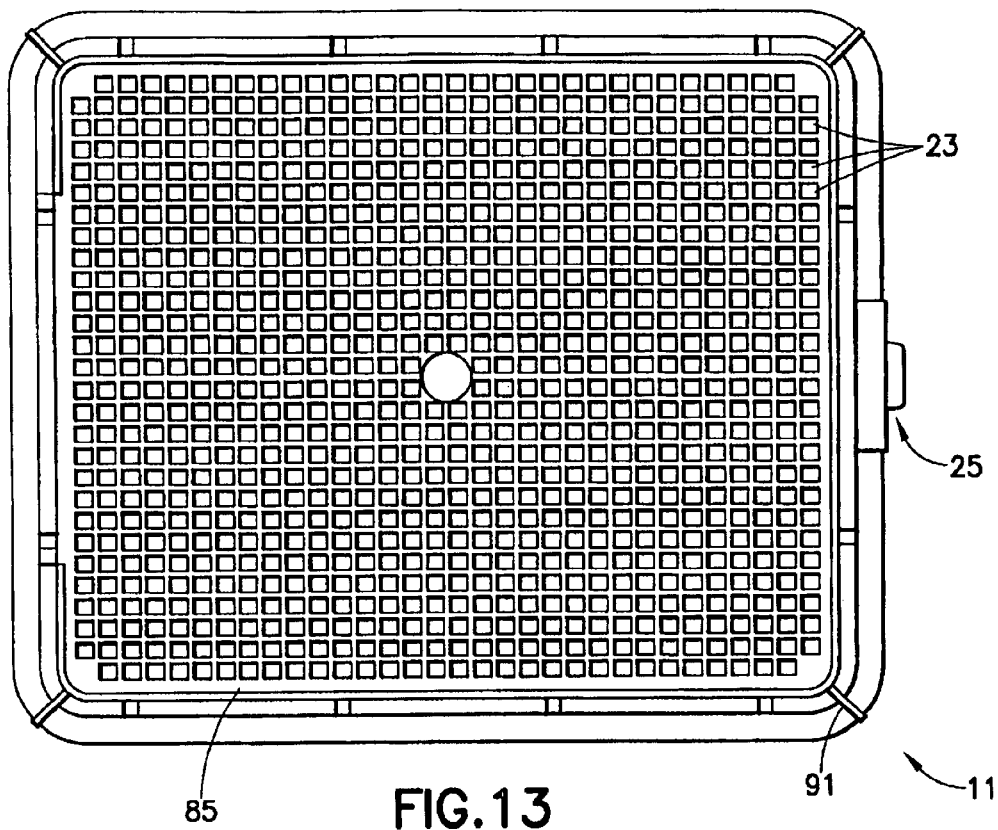
FIG. 13 is a top plan view of a filter cap of the current invention including a secured filter top lock.
Figure 14:
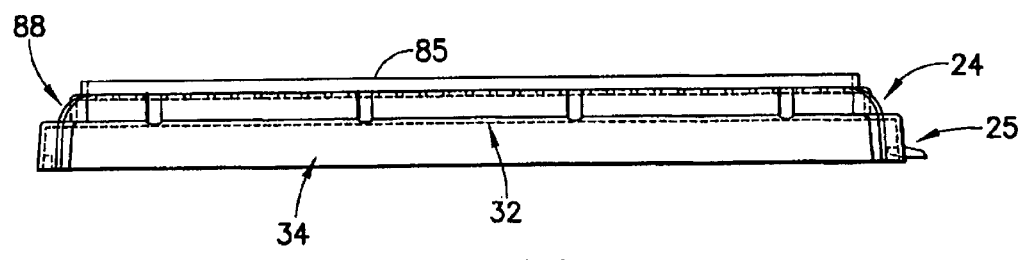
FIG. 14 is a side plan view of a filter cap of the current invention including a rear lock tab.
Figure 21:
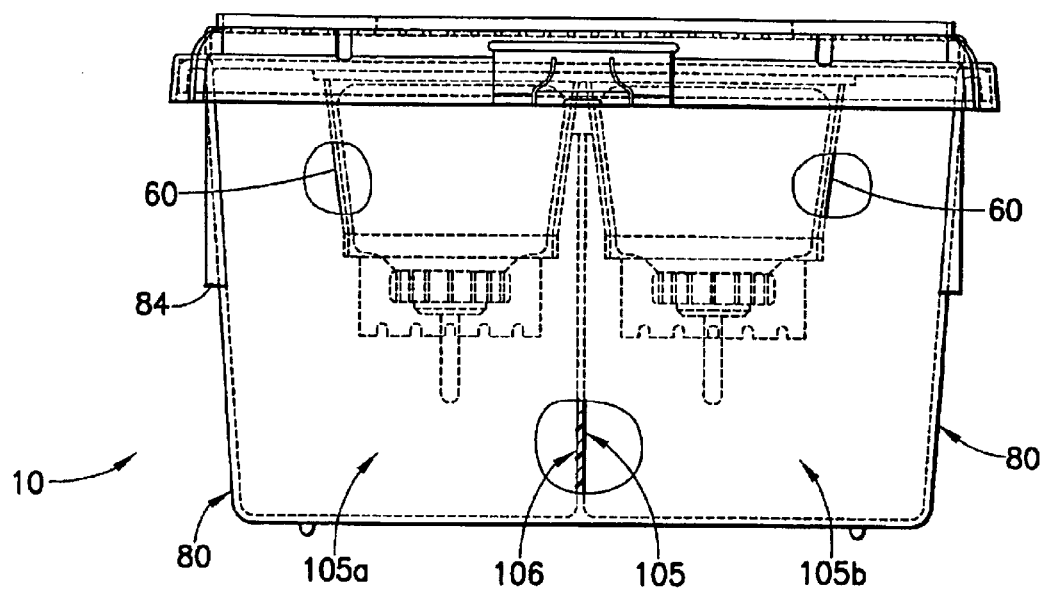
FIG. 21 is a front view of a cage of the current invention, including a partial cutaway of the filter cap, and diet delivery system, also showing a divider element separating a cage of the invention into two compartments.
Figure 23:
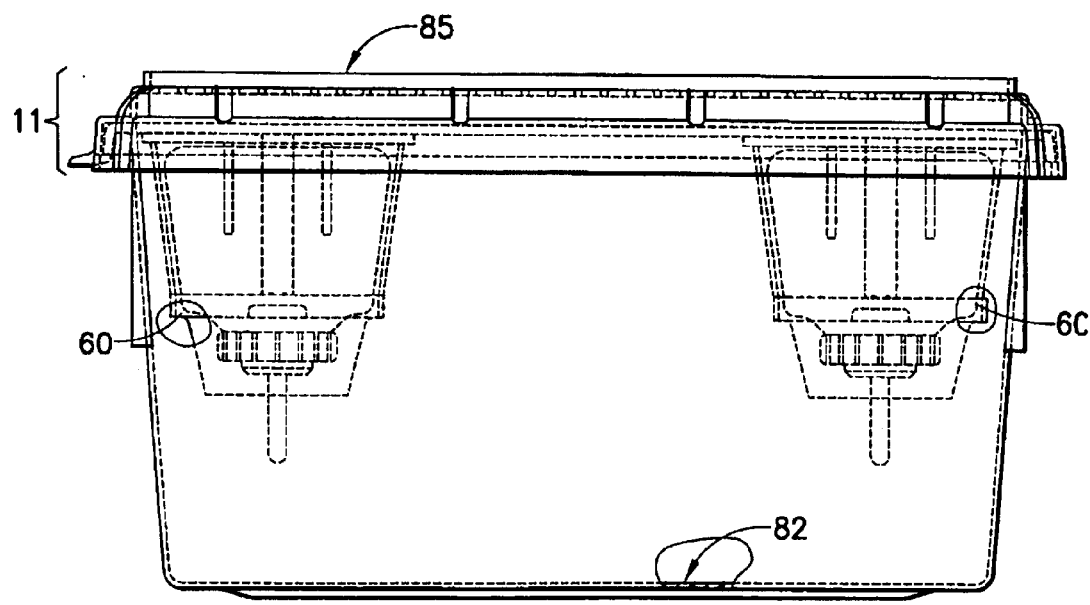
FIG. 23 is a side view of a cage of the current invention with a partial phantom of the divider element embodiment of the invention used to separate a cage of the animal isolation and caging system of the present invention, including a view of the diet delivery systems put in place for multiple animals when the divider element is utilized.
Figure 22:
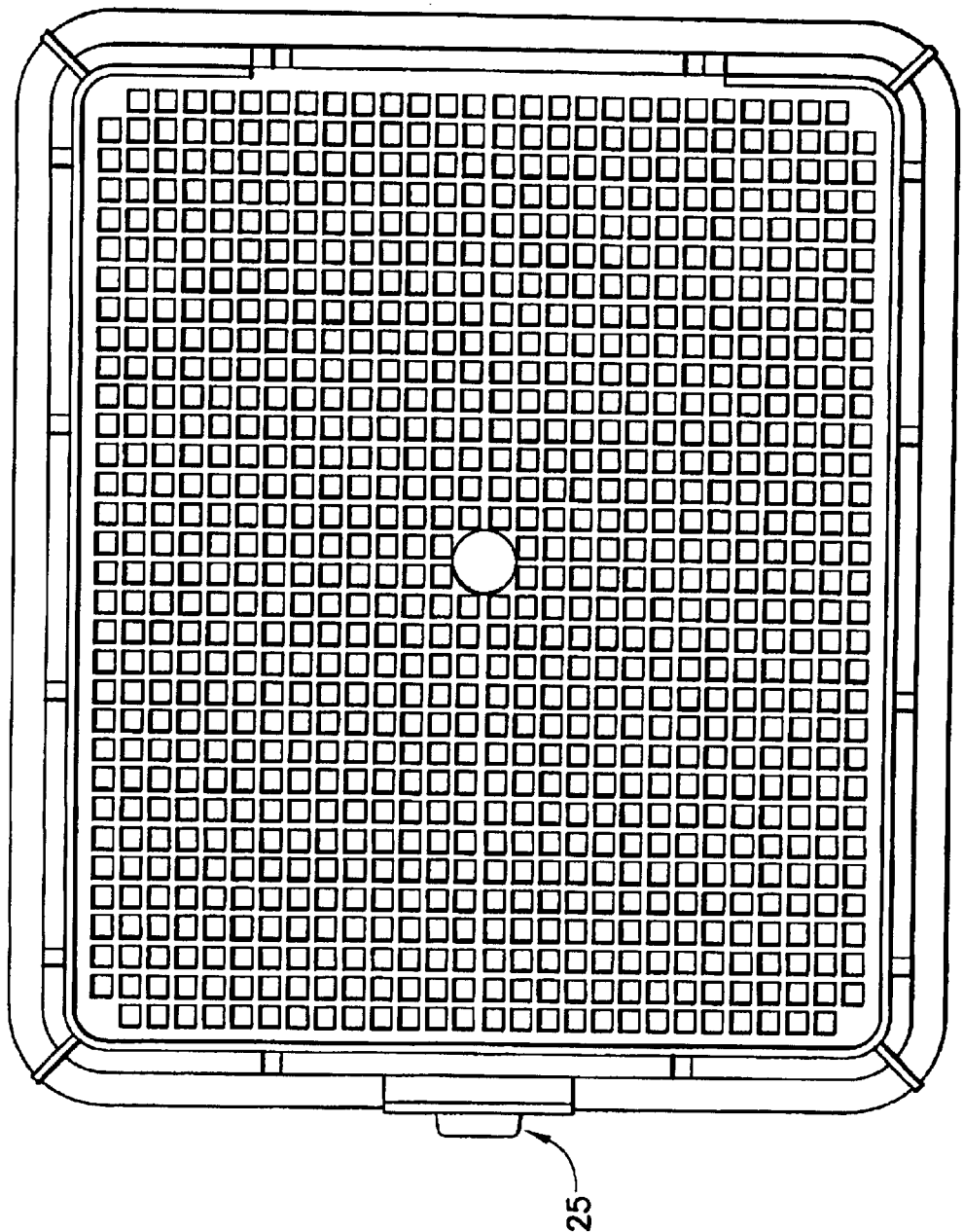
FIG. 22 is a top view of a cage of the current invention with detents for holding the filter retainer of the cage top onto the filter frame of the invention.

Reference is now made to FIGS. 3 and 14, in which a particular configuration of an animal cage is shown which serves to maximize the number of animals which may be maintained in a cage rack system of a given size. Each cage is required to provide a predetermined square area per animal contained in the cage. It is possible to increase the area within the cage by extending the length of the cage, the depth of the cage. By providing increasing the bottom area by extending the cage, it is possible to increase the number of animals within the cage without increasing the associated width or height so that rack and canopy systems as described above can accommodate both the conventional cage and the new larger cage. Preferably, the cage assembly 10 of the current invention has a square area of at least 140 square inches and is capable of supporting two large rats while remaining in compliance with the ILAR and AWA regulations. Most preferably, the cage assembly 10 of the current invention has a square area of 140.8 square inches.

Filter Cap Top Lock

Reference is now made to FIGS. 13–14 and 17–20, wherein a locking mechanism, generally indicated at 25, constructed in accordance with the present invention to secure a variety of sized cages is depicted. Locking mechanism 25 locks a cage assembly 10 and includes a base member 250 a releasable latching member 251. Latching member 251 is integrally attached to base member 250 and when securing a filter cap 11 to a cage body 65 is disposed in a locking position such that foot 252 and shoulder member 254 of latching member 251 are in close locking contact with the lower surface of filter cap 11 and peripheral lip 83 (not shown). Filter lock 25 provides a secure seal for cage assembly 10 through tension from foot 252 and the lower surface of filter cap 11 and peripheral lip 83. This tension can be easily released by an operator by pushing in a downward direction on latching member 251. By further providing a locking mechanism with a base member which is easily detachable by an operator between a locking and unlocked position, a simple mechanism is provided which easily and quickly allows secure locking and unlocking of a cage within a rack system with a minimum of effort and a minimum number of parts. In addition, by providing a locking mechanism which is mounted to a post of a rack system accessible from the front of the rack system, a readily visible locking mechanism is provided which allows an operator to easily determine whether a cage is properly secured within the rack system.

Rotatable Feeder

Now referring to FIGS. 48–51, a second embodiment of cage assembly 10 employing a rotable multiple dosage feeder 300 for a cage body 65 is also provided. The rotatable multiple dosage feeder 300 includes a frame 301 having a cage-interior side, a food holding member 302 rotatably mounted on the frame 301, and a food presentation member 303 disposed on the cage-interior side of the frame 301. The food holding member 302 holds a plurality of measured dosages of food or other substances, and at least a portion of the food holding member 302 extends to the cage-interior side of the frame 301. The food presentation member 303 permits access to a single dosage of the plurality of dosages by an animal within the cage 10. At least a portion of the food holding member 302 is rotatable within the food presentation member so as to expose the single dosage of the plurality of dosages, while the food presentation member 303 prevents access to any remaining dosages on the cage-interior side of the frame 301. With carousel feeder the floor area is 124 sq. inches excluding carousel.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. An animal isolation and caging system comprising:
   a ventilated rack, said rack including at least one air exhaust plenum; and
   at least one canopy attached to said rack for ventilation of cages housed in a said caging system wherein said rack is capable of supporting at least one cage level barrier cage within said rack below said at least one canopy while maintaining a gap between the top of said at least one cage and said at least one canopy so as to permit air to be drawn into said air exhaust plenum from the interior of said at least one cage through a top wall of the top of said at least one cage.

2. The animal isolation and caging system of claim 1, wherein said at least one canopy contacts a top ridge projecting from the upper surface of said at least cage level barrier cage placed within said rack to form a partially enclosed space covering substantially the entire surface of said at least one cage from which air emanating from said at least one cage can be withdrawn.

3. The animal isolation and caging system of claim 2, wherein said rack system includes a vacuum means to draw air from said partially enclosed space above said at least one cage.

4. The animal isolation and caging system of claim 2, wherein said partially enclosed space is not open to ambient air from outside said caging system.

5. The animal isolation and caging system of claim 1, wherein said at least one canopy communicates with said at least one air exhaust plenum through at least one air exhaust duct in said air exhaust plenum.

6. The animal isolation and caging system of claim 1, wherein said at least one canopy and the upper surface of said at least one cage form an exhaust channel through which air is drawn to at least one exhaust duct.

7. The animal isolation and caging system of claim 1, wherein the rack further includes at least one air supply plenum, and wherein said at least one canopy positions said at least one cage to receive air from said air supply plenum.

8. The animal isolation and caging system of claim 1, wherein said at least one canopy further comprises a top plate, a first side wall and a second side wall.

9. The animal isolation and caging system of claim 8, wherein said top and side walls are of substantially the same length as the length of a cage in said rack.

10. The animal isolation and caging system of claim 8, wherein each of the side walls is substantially perpendicular to the top plate.

11. The animal isolation and caging system of claim 8, wherein said top and side walls are integrally formed as a unitary member.

12. The animal isolation and caging system of claim 8, wherein each said at least one cage further comprises a cage body with side walls and a filter cap, said filter cap having side walls which overhang the side walls of said cage body of said at least one cage when said filter cap is mounted on said cage body, and wherein each of the first and second side walls of said at least one canopy further comprise a lip extending perpendicularly from said side walls so that said lip extends underneath at least a portion of the overhanging side walls of the filter cap of said at least one cage.

13. The animal isolation and caging system of claim 1, wherein said at least one canopy is substantially comprised of a material selected from the group consisting of:
   a) glass;
   b) clear plastic;
   c). machined metal;
   d). bakelite; and
   e). other transparent material.

14. The animal isolation and caging system of claim 1, wherein said rack system includes blower means so as to force air into the interior of said at least one cage through a air supply coupling of said at least one cage.

15. An animal isolation and caging system comprising:
   a ventilated rack having an air exhaust plenum;
   a cage level barrier rodent cage removably mountable in the ventilated rack and sized and shaped for housing multiple species of rodents including a plurality of mice or rats, the rodent cage comprising a cage body having a floor and a plurality of side walls extending upward therefrom to define an interior and a peripheral lip, and an open top end, the floor having a length l and a width w, wherein the l×w is substantially 140 square inches;
   a multiple dosage feeder for the rodent cage comprising:
      a frame mounted to and extending through one of the plurality of side walls of the rodent cage and defining a cage-exterior side and a cage-interior side of the frame;
      a food holding member rotatably mounted on the frame adapted to hold a plurality of measured dosages of food or other substances, at least a portion of the food holding member extending into the cage-interior; and
      a food presentation member disposed on the cage-interior side of the frame, the food presentation member permitting access to a single dosage of the plurality of dosages by an animal within the cage, at least a portion of the food holding member being rotatable within the food presentation member so as to selectively expose the single dosage of the plurality of dosages while the food presentation member prevents access to any remaining dosages on the cage-interior side of the frame;
   a canopy disposed within the ventilated rack for providing ventilation of the rodent cage wherein the ventilated rack supports the rodent cage within the ventilated rack below the canopy so as to maintain a gap between the open top end of the rodent cage and the canopy to permit air to be drawn into the air exhaust plenum from the interior of the rodent cage and through the open top end of the rodent cage;
   a filter cap sized and shaped for removable placement on the open top end of the rodent cage, the filter cap comprising:
      a substantially rigid filter frame adapted to cover the open top of the rodent cage, the filter frame having a body portion with an undersufrace, a perforated top wall, and a plurality of side walls extending therefrom forming an open bottom end;
      a substantially rigid filter retainer sized to fit upon the filter frame and to substantially cover the perforated top thereof, the filter retainer having an upper surface with perforations substantially coextensive with the perforations on the top of the filter frame, the filter retainer having side walls extending from its upper surface forming an open bottom end, the perforations in the filter retainer being substantially coextensive with the perforations in the filter frame when the filter retainer is mounted on the top of the filter frame;
      a chew shield detachably securable to the undersurface of the filter frame so as to prevent animals within the rodent cage from damaging the filter cap, the chew shield being sized and shaped to substantially cover the open top end of the rodent cage and having a lower surface with perforations substantially coextensive with the perforations on the top of the filter frame;
      first attachment means for detachably securing the chew shield to the filter frame; and
      second attachment means for detachably securing the filter retainer to the filter frame to permit enclosure of a sheet of filter material therebetween, the first and second attachment means being integrally formed in the filter frame and the filter retainer;
   a filter top lock for locking the rodent cage to prevent an animal held within the rodent cage from removing a top of the rodent cage, the filter top lock comprising:
      a base member;
      a releasable latching member;
      a foot member; and
      a shoulder member;
   wherein the latching member is integrally attached to the base member and when securing a top of the rodent cage to the rodent cage body, the foot and shoulder members of the lock are disposed in a locking position such that foot and shoulder members are in close locking contact with a lower surface of the top of the rodent cage and the peripheral lip of the cage body, and wherein the lock can be released by an operator pushing in a generally downward direction on the latching member; and a filter top change station comprising:
   a base board;
   a first guide support;
   a second guide support separated from the first guide support to define a rodent cage slide path; and
   a first separator mounted on the first guide support along the rodent cage slide path for separating a filter retainer from a cage top when the cage top is moved along the first guide support and second guide support along the rodent cage slide path.

* * * * *